US008705796B2

(12) United States Patent
Ogata et al.

(10) Patent No.: US 8,705,796 B2
(45) Date of Patent: Apr. 22, 2014

(54) OBSTACLE DETECTION DEVICE

(75) Inventors: Takehito Ogata, Hitachi (JP);
Kazutoshi Tsuchiya, Hitachinaka (JP);
Hiroshi Sakamoto, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 62 days.

(21) Appl. No.: 13/391,929

(22) PCT Filed: Jul. 22, 2010

(86) PCT No.: PCT/JP2010/062347
§ 371 (c)(1),
(2), (4) Date: Feb. 23, 2012

(87) PCT Pub. No.: WO2011/036936
PCT Pub. Date: Mar. 31, 2011

(65) Prior Publication Data
US 2012/0170808 A1 Jul. 5, 2012

(30) Foreign Application Priority Data

Sep. 24, 2009 (JP) .................................. 2009-218405

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

2004/0197010 A1* 10/2004 Lee et al. ...................... 382/103
2005/0102070 A1* 5/2005 Takahama et al. ................. 701/1

(Continued)

FOREIGN PATENT DOCUMENTS

| JP | 8-261756 A | 10/1996 |
| JP | 9-35059 A | 2/1997 |

(Continued)

OTHER PUBLICATIONS

Corresponding International Search Report with English Translation dated Aug. 17, 2010 (five (5) pages).
Form PCT/ISA/237 (four (4) pages), dated Aug. 17, 2010.

*Primary Examiner* — Atiba O Fitzpatrick
*Assistant Examiner* — Carol Wang
(74) *Attorney, Agent, or Firm* — Crowell & Moring LLP

(57) ABSTRACT

The present invention provides an obstacle detection device that enables stable obstacle detection with less misdetections even when a bright section and a dark section are present in an obstacle and a continuous contour of the obstacle is present across the bright section and the dark section. The obstacle detection device includes a processed image generating unit that generates a processed image for detecting an obstacle from a picked-up image, a small region dividing unit that divides the processed image into plural small regions, an edge threshold setting unit that sets an edge threshold for each of the small regions from pixel values of the plural small regions and the processed image, an edge extracting unit that calculates a gray gradient value of each of the small regions from the plural small regions and the processed image and generates, using the edge threshold for the small region corresponding to the calculated gray gradient value, an edge image and a gradient direction image, and an obstacle recognizing unit that determines presence or absence of an obstacle from the edge image in a matching determination region set in the edge image and the gradient direction image corresponding to the edge image. The small region dividing unit divides the processed image into the plural small regions on the basis of an illumination state on the outside of the own vehicle.

10 Claims, 16 Drawing Sheets

(56) References Cited

U.S. PATENT DOCUMENTS

2006/0182312 A1* 8/2006 Nakai et al. ............... 382/103
2007/0073484 A1 3/2007 Horibe
2010/0074469 A1* 3/2010 Nakamori et al. .......... 382/103

FOREIGN PATENT DOCUMENTS

| JP | 2005-318408 A | 11/2005 |
| JP | 2007-96510 A | 4/2007 |
| JP | 2009-17157 A | 1/2009 |

* cited by examiner

Fig. 6

Filter for calculating gradient in x direction

Filter for calculating gradient in y direction

Fig. 16
|  | Light and shade difference | |
|---|---|---|
|  | When external light is ON | When external light is OFF |
| Light and shade difference due to unevenness of road surface | 10 | 5 |
| Contour of object A (dark) | 20 | 10 |
| Contour of object B (light) | 10 | 5 |
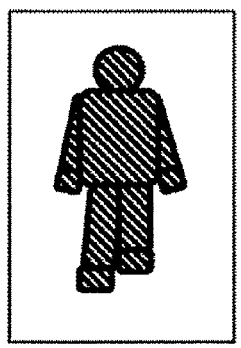 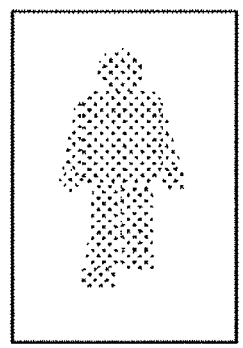
Object A (dark)    Object B (light)

OBSTACLE DETECTION DEVICE

TECHNICAL FIELD

The present invention relates to an obstacle detection device that detects an obstacle in front of an own vehicle.

BACKGROUND ART

To reduce the number of casualties due to traffic accidents, the development of a preventive safety system that prevents accidents is underway. The preventive safety system is a system that operates under a situation in which accidents are highly likely to occur. For example, a pre-crash safety system or the like is put to practical use that calls the attention of a driver with an alarm when a collision with an obstacle in front of the driver's own vehicle is likely to occur and reduces damage to passengers with an automatic brake when a situation in which a collision is unavoidable occurs.

In the system, as a method of detecting obstacles such as a vehicle or a pedestrian, there is a method of picking up an image of the front of the own vehicle with a camera and detecting an obstacle from the picked-up image. In this case, in order to make the detection less easily affected by colors of the obstacle and the background, the system uses a method of calculating an amount of change in a gray value from the picked-up image, generating an edge image obtained by extracting only portions where the amount of change is equal to or larger than a predetermined threshold, and calculating a degree of similarity between a contour of the obstacle on the edge image and templates of contours of obstacles stored in advance to thereby detect the obstacle.

For example, Patent Document 1 describes a method of detecting an object in front of an own vehicle with a laser radar, improving a contrast of a gray value of an image region including the object detected by the laser radar, and extracting an edge. With this method, even when an obstacle is present in a dark place such as the inside of a tunnel or the shade and a change in a gray value between the obstacle and the background is small, since a contrast of an image region including the object is improved, the change in the gray value increases and an edge can be extracted.

Patent Document 1: JP Patent Publication (Kokai) No. 2007-96510

Disclosure of the Invention

Problems to be Solved by the Invention

However, when a continuous contour of an obstacle is present across a bright section and a dark section, for example, when a headlamp of the own vehicle is on and light strikes a part of an obstacle such as a pedestrian or when the road surface is reflected and only the pedestrian's feet are lit up during backlight, even if a contrast is improved in an image region including the obstacle, a contrast of the dark section is not improved and an edge cannot be extracted. As a result, a contour present in the dark section among contours of the obstacle cannot be extracted and the obstacle is not recognized.

When a threshold for an edge is tuned to make it possible to extract a contour in the dark section where a change in a gray value is small, the laser radar reacts to a slight change in the bright section and misdetections frequently occur. In particular, if this phenomenon occurs in a place where nothing is present in front of the own vehicle, an alarm or an automatic brake is actuated in the place and the safety of the own vehicle is spoiled.

The present invention has been devised in view of the problems and it is an object of the present invention to provide an obstacle detection device that enables stable obstacle detection with less misdetections even when a bright section and a dark section are present in an obstacle and a continuous contour of the obstacle is present across the bright section and the dark section.

Means for Solving the Problems

In order to solve the problems, an obstacle detection device according to the present invention includes: an image acquiring unit that captures an image obtained by picking up an image of the outside of an own vehicle; a processed image generating unit that generates a processed image for detecting an obstacle from the captured image; a small region dividing unit that divides the processed image into plural small regions; an edge threshold setting unit that sets an edge threshold for each of the small regions from pixel values of the plural small regions and the processed image; an edge extracting unit that calculates a gray gradient value of each of the small regions from the plural small regions and the processed image and generates, using the edge threshold for the small region corresponding to the calculated gray gradient value, a binary edge image and a gradient direction image having information concerning the direction of an edge; an obstacle recognizing unit that sets a matching determination region for detecting an obstacle in the edge image and determines presence or absence of an obstacle from the edge image in the matching determination region and the gradient direction image corresponding to the edge image; and a recognition result output unit that outputs a result of the determination of presence or absence of an obstacle. The small region dividing unit is configured to divide the processed image into the plural small regions on the basis of an illumination state on the outside the own vehicle.

An obstacle detection device according to the present invention includes: an image acquiring unit that captures an image obtained by picking up an image of the outside of an own vehicle; a processed region setting unit that sets a processed region for detecting an obstacle from the captured image; a small region dividing unit that divides the processed region into plural small regions; an edge threshold setting unit that sets an edge threshold for each of the small regions from pixel values of the plural small regions and the image captured by the image acquiring unit; an edge extracting unit that calculates a gray gradient value of each of the small regions from the plural small regions and the image captured by the image acquiring unit and generates, using the edge threshold for the small region corresponding to the calculated gray gradient value, a binary edge image and a gradient direction image having information concerning the direction of an edge; an obstacle recognizing unit that sets a matching determination region for detecting an obstacle in the edge image and determines presence or absence of an obstacle from the edge image in the matching determination region and the gradient direction image corresponding to the edge image; and a recognition result output unit that outputs a result of the determination of presence or absence of an obstacle. The small region dividing unit is configured to divide the processed region into the plural small regions on the basis of an illumination state on the outside the own vehicle.

Advantages of the Invention

It is possible to provide an obstacle detection device that enables stable obstacle detection with less misdetections even when a bright section and a dark section are present in an obstacle and a continuous contour of the obstacle is present across the bright section and the dark section.

This specification incorporates contents described in the specification and/or the drawings of Japanese Patent Application No. 2009-218405 that is the base of the priority of this application.

BRIEF DESCRIPTION OF THE DRAWINGS

FIG. 6 is a diagram showing the weight of a Sobel filter used in an edge extracting unit of the present invention.

FIG. 16 is a diagram for explaining an example to which the obstacle detection device of the present invention is applied.

Figure 1:
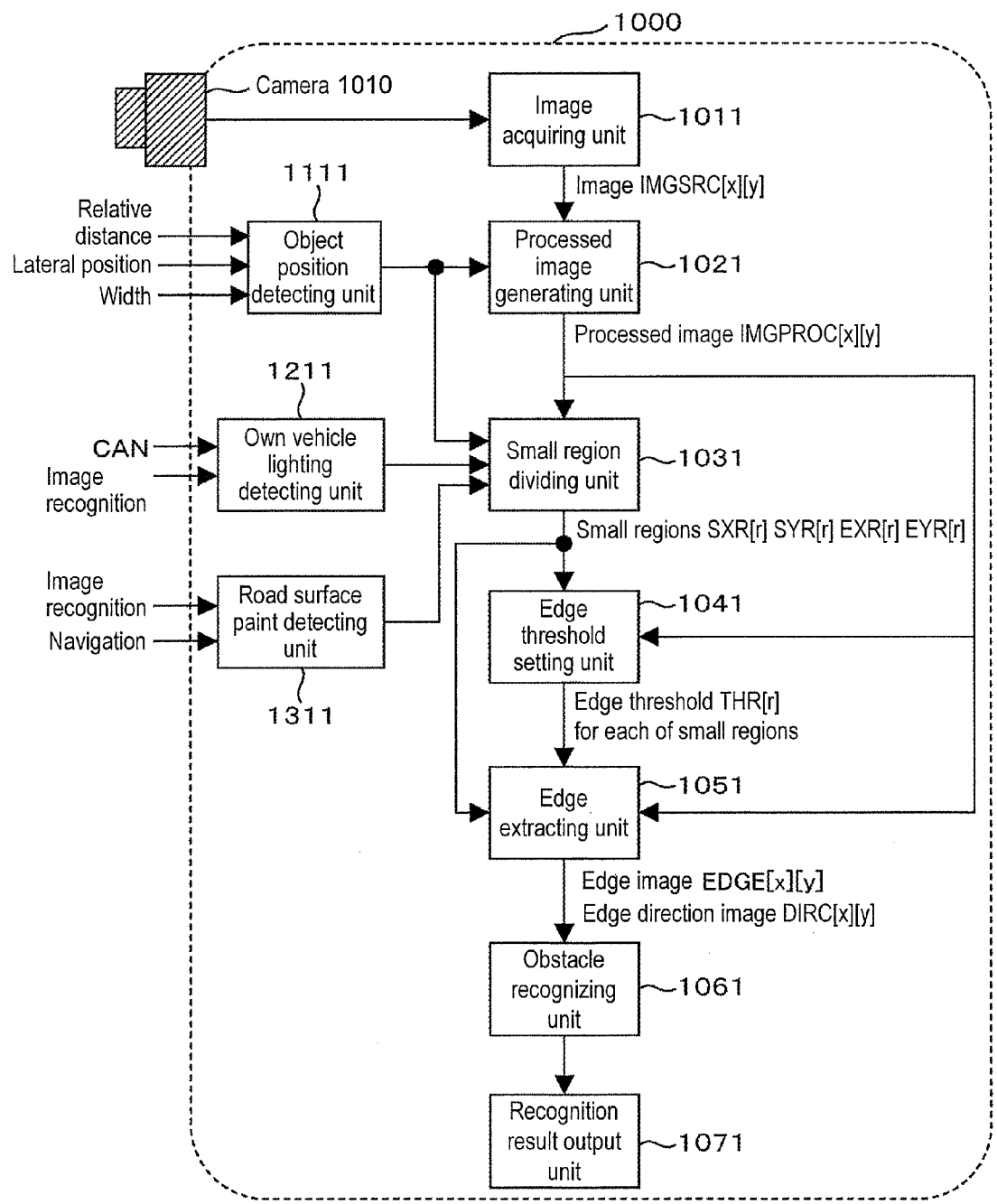
FIG. 1 is a diagram showing a first embodiment of an obstacle detection device according to the present invention.

DESCRIPTION OF SYMBOLS 71 local edge determiner
81 discriminator
711 local edge frequency calculating unit
712 threshold processing unit
812 totaling unit
813 threshold processing unit
1000, 2000 vehicle-mounted object detection devices
1010 camera
1011 image acquiring unit
1021 processed image generating unit
1031, 2031 small region dividing units
1041, 2041 edge threshold setting units
1051, 2051 edge extracting units
1061, 2061 obstacle recognizing units
1071 recognition result output unit
1111 object position detecting unit
1211 own vehicle lighting detecting unit
1311 road surface paint detecting unit
2021 processed region setting unit
7111 window
7112 local edge frequency calculation region
7113 angle condition
8101 to 8140 local edge frequency determiners

BEST MODE FOR CARRYING OUT THE INVENTION

A first embodiment of an obstacle detection device according to the present invention is explained in detail below using the drawings. FIG. 1 is a block diagram of a vehicle-mounted object detection device 1000 in the first embodiment.

The vehicle-mounted object detection device 1000, which is an obstacle detection device, is incorporated in a camera 1010, which is an image pick-up device, mounted on an automobile, an integrated controller, or the like and used for detecting an obstacle such as a pedestrian set in advance from the inside of an image of the outside of an own vehicle picked up by the camera 1010. In this embodiment, the vehicle-mounted object detection device 1000 is configured to detect a pedestrian from the inside of an image obtained by picking up an image in front of the own vehicle.

The vehicle-mounted object detection device 1000 includes a computer including a CPU, a memory, and an I/O. The vehicle-mounted object detection device 1000 is programmed with predetermined processing and repeatedly executes the processing at a period set in advance.

The vehicle-mounted object detection device 1000 includes, as shown in FIG. 1, an image acquiring unit 1011, a processed image generating unit 1021, a small region dividing unit 1031, an edge threshold setting unit 1041, an edge extracting unit 1051, an obstacle recognizing unit 1061, and a recognition result output unit 1071 and further includes, depending on an embodiment, an object position detecting unit 1111, an own vehicle lighting detecting unit 1211, and a road surface paint detecting unit 1311.

The image acquiring unit 1011 captures an image obtained by photographing the outside of the own vehicle from the camera 1010 attached to a position where the camera 1010 can pick up an image of the outside of the own vehicle including the front of the own vehicle and writes the image on a RAM as an image IMGSRC[x][y]. The image IMGSRC[x][y] is a two-dimensional array and x and y respectively indicate coordinates of the image.

The processed image generating unit 1021 generates a processed image IMGPROC[x][y] for detecting a pedestrian, who is an obstacle, from the inside of the image IMGSRC[x][y]. The processed image IMGPROC[x][y] is an image obtained by enlarging or reducing a part of the image IMGSRC[x][y] with a predetermined coefficient. Details of the processing are explained later.

The small region dividing unit 1031 divides the processed image IMGPROC[x][y] into plural small regions (SXR[r], SYR[r], EXR[r], EYR[r]). Here, r represents an ID number of the small region. Although details of the division are explained later, the processed image is divided into plural small regions on the basis of an illumination state on the outside of the own vehicle.

The edge threshold setting unit 1041 determines an edge threshold THR[r] for each of the small regions from pixel values of the processed image IMGPROC[x][y] in the small regions (SXR[r], SYR[r], EXR[r], EYR[r]). Details of setting of the threshold are explained later.

The edge extracting unit 1051 calculates gray gradient values in the small regions of the processed image IMGPROC[x][y] and generates a binary edge image EDGE[x][y] and a gradient direction image DIRC[x][y] having information concerning the direction of an edge using the edge threshold THR[r] of a small region corresponding thereto. Details of the processing are explained later.

The obstacle recognizing unit 1061 sets, in the edge image EDGE[x][y], matching determination regions (SXG[g], SYG[g], EXG[g], EYG[g]) for performing obstacle determination (e.g., pedestrian determination) and determines, using the edge image EDGE[x][y] in the matching determination regions and the gradient direction image DIRC[x][y] in a region of a position corresponding thereto. Here, g represents an ID number given when plural regions are set. Details of the recognition processing are explained later.

The recognition result output unit 1071 performs, on the basis of a determination result of the obstacle recognizing unit 1061, output for changing a function of a vehicle according to obstacle information including at least a relative distance PYO[b] between an obstacle such as a recognized pedestrian and the vehicle. For example, the recognition result output unit 1071 outputs a position (the relative distance PYO[b], a lateral position PXO[b], and lateral width WDO[b]) of the recognized pedestrian. Here, b represents an ID number given when plural objects are detected. These outputs may be directly output from the vehicle-mounted object detection device 1000 or communication using a LAN (Local Area Network) may be performed.

Figure 3:
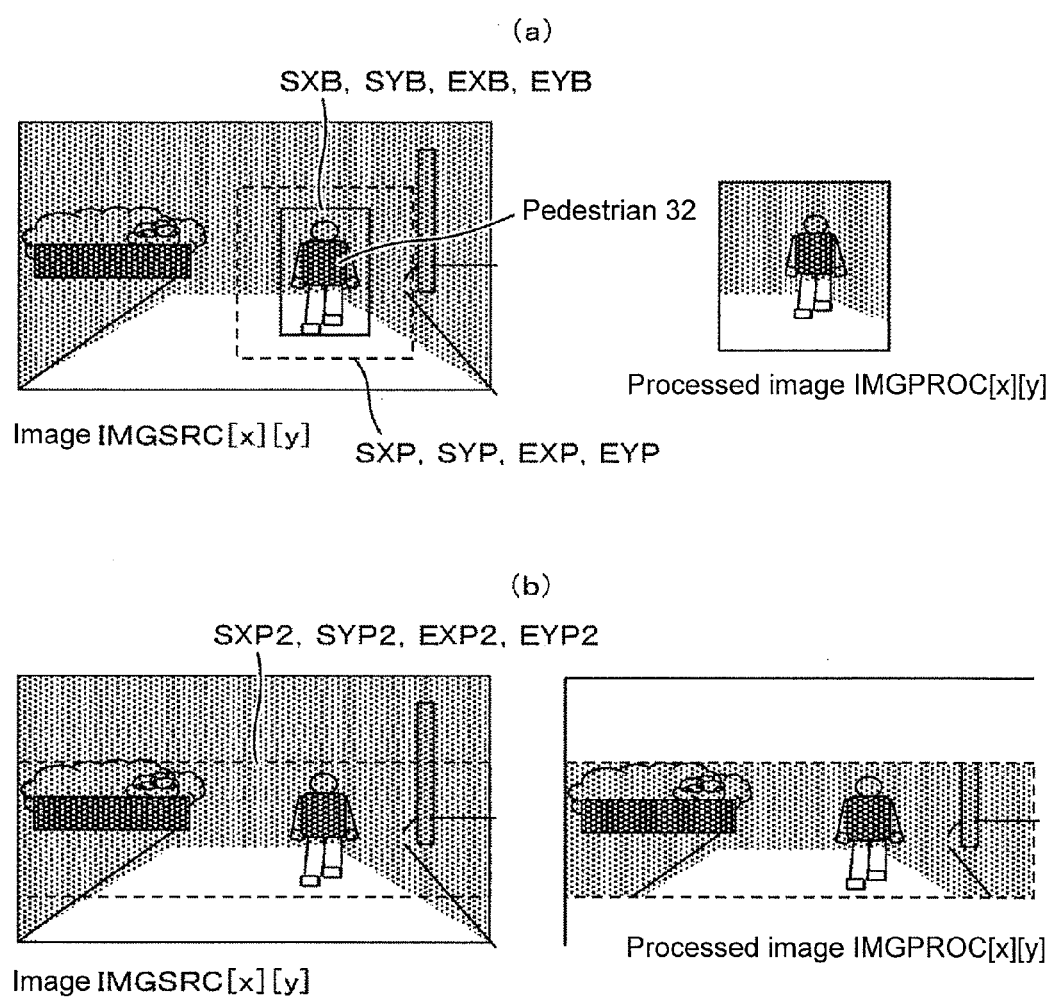
FIG. 3 is a diagram showing an example of processing in a processed image generating unit of the present invention.

The object position detecting unit 1111 acquires a detection signal from a radar, which is an obstacle detecting unit that detects an object around the own vehicle, such as a millimeter wave radar or a laser radar mounted on the own vehicle and detects the position of an obstacle present in front of the own vehicle. For example, as shown in FIG. 3, the object position detecting unit 1111 acquires a position (a relative distance PY[b], a lateral position PX[b], and lateral width WD[b]) of an obstacle such as a pedestrian 32 around the vehicle from the radar. Here, b represents an ID number given when plural objects are detected. Position information of these objects may be acquired by directly inputting a signal of the radar to the vehicle-mounted object detection device 1000 or may be acquired by performing communication using the radar and the LAN (Local Area Network). The object position detected by the object position detecting unit 1111 is used by the processed image generating unit 1021 and the small region dividing unit 1031.

The own vehicle lighting detecting unit 1211 determines whether the own vehicle has its lamps on and, if the own vehicle has its lamps on, outputs "1" and, otherwise, outputs "0". As the lighting determination, whether the lamps are on may be determined by directly inputting a signal of a light switch or a signal of the light switch may be acquired by performing communication using the LAN (Local Area Network) to determine whether the lamps are on. Whether the lamps are on may be determined using light and shade of an image acquired by the image acquiring unit 1011. For example, when the lamps are on, the inside of a lighted range appears bright and the outside of the range appears dark. Therefore, for example, it is possible to calculate, using a camera image and a camera geometric model, a light illuminated range on the road surface on an image and determine whether the lamps are on according to whether a difference between an average luminance value in the light illuminated range and an average luminance value outside the light illuminated range is equal to or larger than a fixed threshold. An output of the own vehicle lighting detecting unit 1211 is used by the small region dividing unit 1031.

The road surface paint detecting unit 1311 detects a road surface paint on a pedestrian crossing or the like present in front of the own vehicle. For the detection of the road surface paint, there is a method of acquiring information concerning navigation through communication using the LAN (Local Area Network), acquiring, for example, information concerning a crossing with a traffic light, and acquiring a distance from the own vehicle to the pedestrian crossing. The road surface paint detecting unit 1311 may determine the road paint using light and shade of an image acquired by the image acquiring unit 1011. For example, since the road paint on the pedestrian crossing or the like is white, an image of the road surface paint is picked up bright on the image. Therefore, the road surface paint can be detected by means explained below. First, the road surface paint detecting unit 1311 calculates, using a camera image and a camera geometric model, a road surface region of the image on the image and extracts pixels in which luminance values of the road surface region is equal to or larger than a threshold TH_GBright. Subsequently, the road surface paint detecting unit 1311 groups the extracted pixels into groups of the pixels adjacent to one another and acquires, from a region where an area is a threshold TH_GArea among the grouped regions, a y coordinate Y_Gmin at the upper end on the image of a region present at the highest position on the image. Further, the road surface paint detecting unit 1311 calculates a distance from the own vehicle to the position of Y_Gmin using a camera geometry. According to the processing explained above, it is possible to calculate a distance from the own vehicle to the road surface paint. An output of the road surface paint detecting unit 1311 is used by the small region dividing unit 1031.

Figure 2:
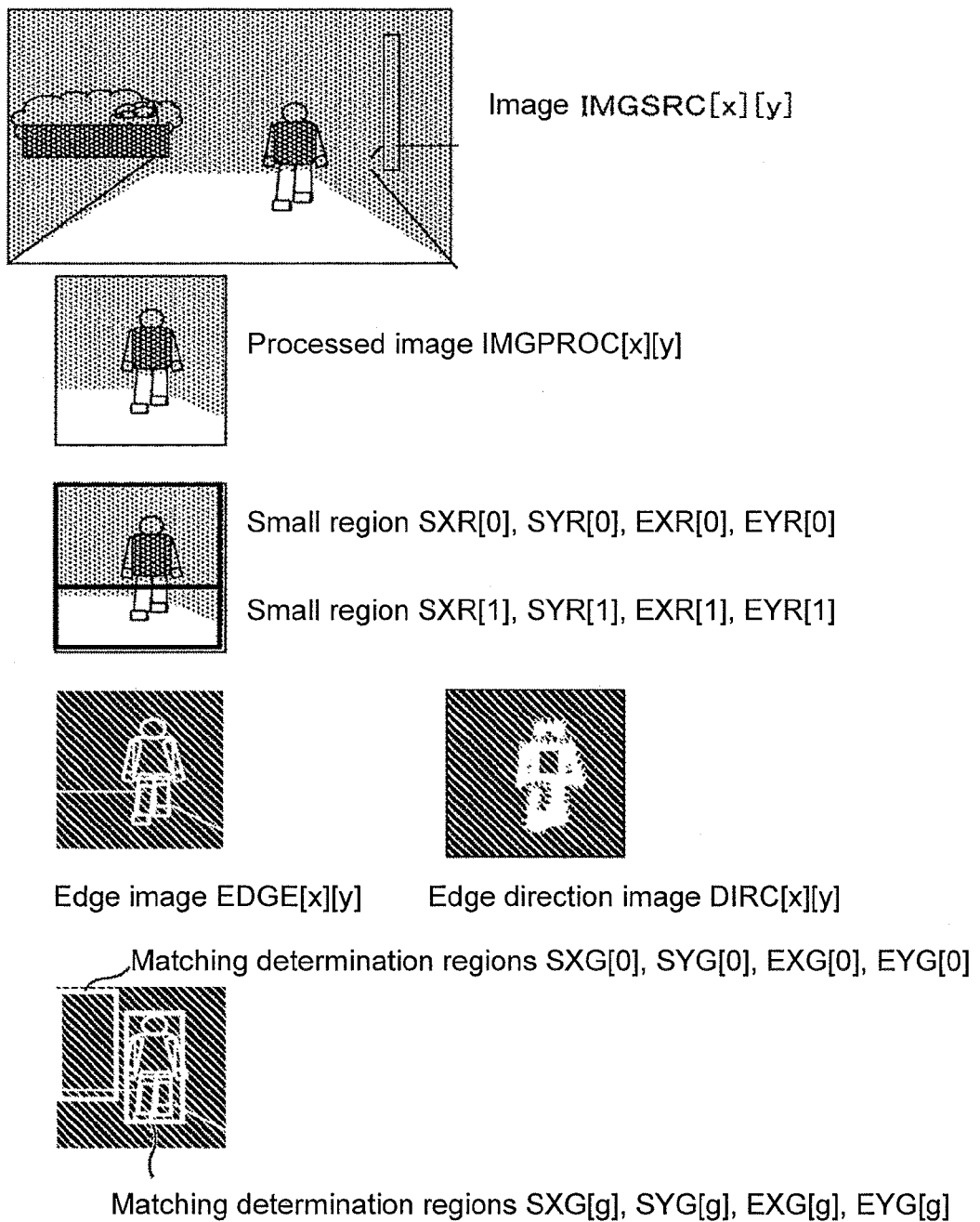
FIG. 2 is a schematic diagram representing images and parameters used in the obstacle detection device according to the present invention.

FIG. 2 is a diagram showing, using an example, the images and the regions used in the above explanation. As shown in the figure, the processed image IMGPROC[x][y] is generated from the image IMGSRC[x][y]. The edge image EDGE[x][y] and the gradient direction image DIRC[x][y] are generated from the processed image IMGPROC[x][y]. The small regions (SXR[r], SYR[r], EXR[r], EYR[r]) are set to divide the processed image IMGPROC[x][y]. The matching determination regions (SXG[g], SYG[g], EXG[g], EYG[g]) are regions having a determined size in the edge image EDGE[x][y] and the gradient direction image DIRC[x][y].

Next, content of the processing in the processed image generating unit 1021 is explained using FIG. 3. FIG. 3 shows an example of the processing by the processed image generating unit.

The processed image generating unit 1021 selects a region where pedestrian detection processing is performed in the image IMGSRC[x][y], calculates a range of coordinates of the region, a start point SXP and an end point EXP on an x coordinate (the lateral direction) and a start point SYP and an end point EYP on a y coordinate (the longitudinal direction), and generates the processed image IMGPROC[x][y] from the region.

The processed image generating unit 1021 may use or may not use the object position detecting unit 1111. First, processing performed when the object position detecting unit 1111 is used in the processed image generating unit 1021 is explained. FIG. 3(*a*) is an example of the processing by the processed image generating unit performed when the object position detecting unit 1111 is used.

The processed image generating unit 1021 calculates, from the relative distance PY[b], the lateral position PX[b], and the lateral width WD[b] of an obstacle detected by the object position detecting unit 1111, a position on an image of the detected obstacle (a start point SXB and an end point EXB on the x coordinate (the lateral direction) and a start point SYB and an end point EYB on the y coordinate (the longitudinal direction)). If camera geometric parameters that associate coordinates on a camera image and a positional relation in the real world are calculated in advance by a method such as camera calibration and the height of an object is assumed as, for example, 180 [cm] in advance, a position on the image is uniquely determined.

In some cases, a difference between a position on an image of an object detected by the object position detecting unit 1111 and a position on an image of the same object appearing in a camera image occurs because of reasons such as an error of attachment of the camera 1010 and a delay in communication with a radar. Therefore, an object position (SXP, EXP, SYP, EYP) obtained by correcting an object position (SXB, EXB, SYB, EYB) on the image is calculated. The correction expands a region by a predetermined amount or moves the region. For example, SXB, EXB, SYB, and EYB are expanded up and down and to the left and right by a predetermined number of pixels.

Further, the processed image generating unit 1021 slices out the image IMGSRC[x][y] surrounded by the corrected object position (SXP, EXP, SYP, EYP) and enlarges or reduces the size of the object in the image to a predetermined size to thereby generate the processed image IMGPROC[x][y]. In this embodiment, the processed image generating unit 1021 enlarges or reduces the image using the camera geometry such that all objects having height of 180 [cm] and width of 60 [cm] have a size of 16 dots×12 dots in the processed image IMGPROC[x][y].

In other words, when the object position detecting unit 1111 is used, the processed image generating unit 1021 generates the processed image IMGPROC[x][y] on the basis of the image IMGSRC[x][y] acquired from the image acquiring unit 1011 and the position of the obstacle detected by the object position detecting unit 1111.

When the processing is applied to plural regions, the processed image generating unit 1021 generates processed images IMGPROC[x][y] of the regions and separately carries out, for the respective processed images, processing by a division boundary setting unit to processing by an obstacle recognizing unit explained below.

Next, processing for generating the processed image IMGPROC[x][y] without using the object position detecting unit 1111 in the processed image generating unit 1021 is explained.

As a method of selecting a region when the object position detecting unit 1111 is not used, for example, there are a method of setting a region to search through an entire image while changing the size of a region and a method of setting a region while limiting the region to a specific position and a specific size. When the region is limited to the specific position, there is a method of limiting, using, for example, own vehicle speed, the region to a position to where the own vehicle advances after T seconds.

FIG. 3(b) is an example of a search for a position to where the own vehicle advances after 2.3 seconds. As the position and the size of a processed region, the processed image generating unit 1021 calculates a range (SYP2, EYP2) in the y direction on the image IMGSRC[x][y] using the camera geometric parameters from road surface height (0 cm) at a relative distance to the position to where the own vehicle advances after 2.3 seconds and assumed height of a pedestrian (in this embodiment, 180 cm). A range (SXP2, EXP2) in the x direction may not be limited or may be limited according to, for example, a predicted route of the own vehicle.

Further, the processed image generating unit 1021 slices out the image IMGSRC[x][y] surrounded by the corrected object position (SXP, EXP, SYP, EYP) and enlarges or reduces the size of the object in the image to a predetermined size to thereby generate the processed image IMGPROC[x][y]. In this embodiment, the processed image generating unit 1021 enlarges or reduces the image using the camera geometry such that all objects having height of 180 [cm] and width of 60 [cm] have a size of 16 dots×12 dots in the processed image IMGPROC[x][y].

Figure 4:
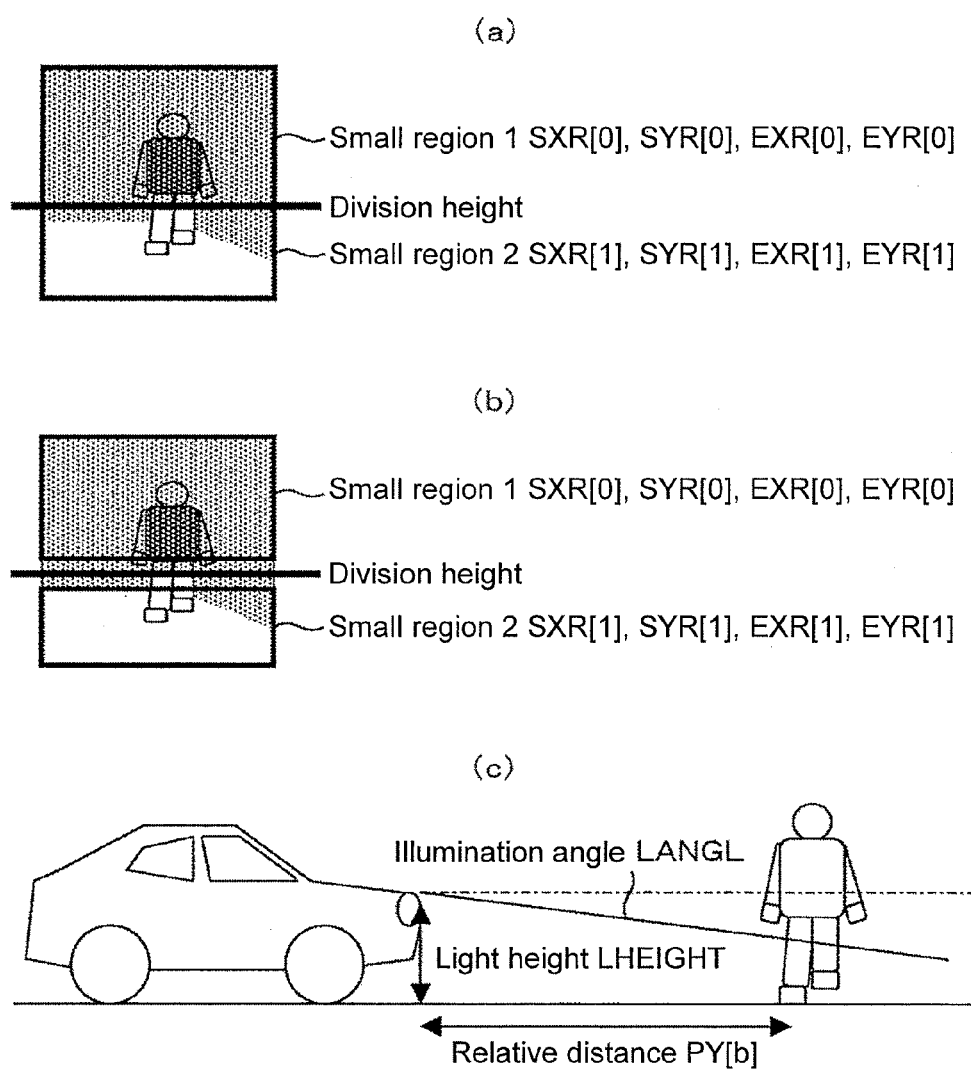
FIG. 4 is a diagram showing a division example of a small region dividing unit of the present invention.
Figure 5:
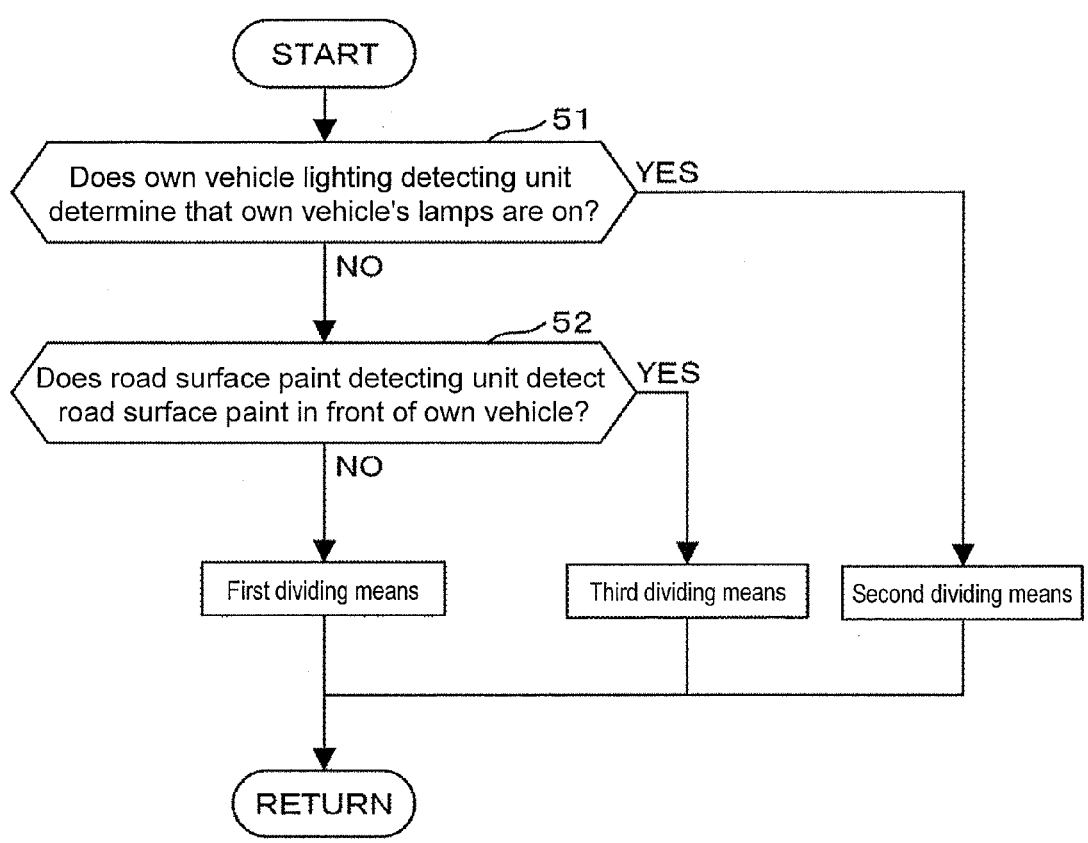
FIG. 5 is a diagram showing a flowchart of the small region dividing unit of the present invention.

Next, content of the processing in the small region dividing unit 1031 is explained using FIGS. 4 and 5. FIG. 4 is a division example of the small region dividing unit 1031. FIG. 5 is a flowchart in this embodiment of the small region dividing unit 1031.

In this embodiment, as a system for division into small regions, three kinds of dividing methods are explained: a system using the object position detecting unit 1111 and the own vehicle lighting detecting unit 1211, a system using the road surface paint detecting unit 1311, and a system not using any of the object position detecting unit 1111, the own vehicle lighting detecting unit 1211, and the road surface paint detecting unit 1311. Next, a method of selecting the three systems according to an illumination state on the outside of the vehicle is explained.

First, a first division system not using any of the object position detecting unit 1111, the own vehicle lighting detecting unit 1211, and the road surface paint detecting unit 1311 is explained. In this case, the small region dividing unit 1031 divides the processed image IMGPROC[x][y] into upper and lower regions with a y coordinate VPY at a vanishing point of an image as a boundary: a small region 1 (SXR[0], SYR[0], EXR[0], EYR[0]=VPY) and a small region 2 (SXR[1], SYR[1]=VPY, EXR[1], EYR[1]). The small region 1 and the small region 2 may be set without a gap as shown in FIG. 4(a). As shown in FIG. 4(b), for example, hysteresis of about five pixels may be provided with division height VPY on the image as a boundary to prevent an edge due to a difference in an illumination state from occurring. In the case of an example shown in FIG. 4(b), all edges in the portion of the hysteresis are set to zero.

Next, a second division system using the object position detecting unit 1111 and the own vehicle lighting detecting unit 1211 is explained. As shown in FIG. 4(c), when an image including an obstacle detected by the object position detecting unit 1111 is generated by the processed image generating unit 1021 and it is determined by the own vehicle lighting detecting unit 1211 that the own vehicle is emitting light, the small region dividing unit 1031 calculates light illumination height LZ for an object according to Equation (1) below from the relative distance PY[b] of the obstacle detected by the object position detecting unit 1111, an illumination angle LANGL of the light of the own vehicle, and light height LHEIGHT of the own vehicle.

$$LZ = LHEIGHT - PY[b]\tan(LANGL) \quad (1)$$

The illumination angle LANGL of the light of the own vehicle and the light height LHEIGHT of the own vehicle are values set in advance according to a type of a vehicle.

The small region dividing unit 1031 converts LZ into a coordinate LZY on the image using the camera geometry and divides the processed image IMGPROC[x][y] into a small region 1 (SXR[0], SYR[0], EXR[0], EYR[0]=LZY) and a small region 2 (SXR[1], SYR[1]=LZY, EXR[1], EYR[1]) with LZY as a boundary. The small region 1 and the small region 2 may be set without a gap as shown in FIG. 4(a). As shown in FIG. 4(b), for example, hysteresis of about five pixels may be provided with division height LZY on the image as a boundary to prevent an edge due to light from occurring. In the case of the example shown in FIG. 4(b), all edges in the portion of the hysteresis are set to zero.

Further, a third division system using the road surface paint detecting unit 1311 is explained. In this case, the small region dividing unit 1031 divides the processed image IMGPROC[x][y] into upper and lower images with the position of detected road surface paint as a boundary. When a distance to the road surface paint is represented as PZ, the small region dividing unit 1031 converts, using a camera geometry model, the distance PZ into a y coordinate position PZY of the road surface paint on the image and divides, with PZY as a boundary, the processed image IMGPROC[x][y] into a small region 1 (SXR[0], SYR[0], EXR[0], EYR[0]=PZY) and a small region 2 (SXR[1], SYR[1]=PZY, EXR[1], EYR[1]). The small region 1 and the small region 2 may be set without a gap as shown in FIG. 4(a). As shown in FIG. 4(b), for example, hysteresis of about five pixels may be provided with division height PZY on the image as a boundary to prevent an edge due to a difference in an illumination state from occurring. In the case of the example shown in FIG. 4(b), all edges in the portion of the hysteresis are set to zero.

Next, a method of selecting the three division systems according to an illumination state on the outside of the vehicle is explained using FIG. 5. FIG. 5 is a flowchart describing switching conditions for the three division systems.

First, in step 51, the small region dividing unit 1031 determines, using an output of the own vehicle lighting detecting unit 1211, whether the own vehicle has its lamps on. When it is determined that the own vehicle has its lamps on, the small region dividing unit 1031 selects the second dividing means. When the own vehicle does not have its lamps on, the small region dividing unit 1031 shifts to the next step.

Subsequently, at step 52, the small region dividing unit 1031 determines, using an output of the road surface paint detecting unit 1311, whether road surface paint is present in front of the own vehicle. When it is determined that road surface paint is present in front of the own vehicle, the small region dividing unit 1031 selects the third dividing means. When it is determined that road surface paint is absent, the small region dividing unit 1031 selects the first dividing means.

As explained above, when it is determined by the own vehicle lighting detecting unit 1211 that the headlamp of the own vehicle is emitting light, the small region dividing unit 1031 determines that a part of a pedestrian is lit up by the headlamp of the own vehicle, selects the second dividing means, and can divide a processed image into a region where the headlamps are emitting light and a dark region. When road surface paint is detected in front of the own vehicle by the road surface paint detecting unit 1311, the small region dividing unit 1031 determines that the lower half body of a pedestrian standing on the road surface paint appears bright, selects the third dividing means, and can divide a processed image into a bright region including the road surface paint and a region without the road surface paint. Further, when the headlamp of the own vehicle is not on and road surface paint is not detected, the small region dividing unit 1031 selects the first dividing means. Even when the road surface is reflected by backlight and appears bright, the first dividing means can divide the processed image into a region bright with backlight and a region where the road surface does not appear.

In this embodiment, as the three dividing means, the road surface paint detecting unit 1311 only has to include at least the first dividing means and does not need to include all the three dividing means. When the road surface paint detecting unit 1311 does not include any one of the dividing means, the conditional branch shown in FIG. 5 follows the route of NO.

Next, content of the processing by the edge threshold setting unit 1041 is explained.

The edge threshold setting unit 1041 determines the edge threshold THR[r] according to an average AVE[r] and a variance VAR[r] of gray values in the small regions SXR[r], SYR[r], EXR[r], and EYR[r] of the processed image IMGPROC[x][y]. Here, r is an ID number of the small region.

The edge threshold is determined by, for example, a method of using a table having the average AVE[r] of gray values as an argument or a method of using a two-dimensional map having the average AVE[r] and the variance [r] of gray values as arguments.

In the method of using the map having the average AVE[r] and the variance VAR[r] as arguments, a threshold of an optimum edge in images having various kinds of brightness is manually determined in advance and averages and variances at that point formed as a map are used. Consequently, it is possible to determine an optimum threshold from the average AVE[r] and the variance VAR[r] of gray values in the small regions.

For determination of the edge threshold THR[r], an average and a variance of pixel values of an image obtained as a result of applying, for example, a Sobel filter for the processed image IMGPROC[x][y] may be used rather than gray values. An arithmetic operation of the Soble filter is explained later.

Next, content of the processing by the edge extracting unit 1051 is explained.

The edge extracting unit 1051 applies a differential filter such as a Sobel filter to the processed image IMGPROC[x][y] to calculate the intensity and the direction of the gradient of an image and subjects the intensity of the gradient to threshold processing to thereby extract an edge. In the following explanation, the Sobel filter is applied as the differential filter.

The Sobel filter has a size of 3×3 as shown in FIG. 6. Two kinds of filters are present: an x direction filter 61 that calculates a gradient in the x direction and a y direction filter 62 that calculates a gradient in the y direction. In calculating a gradient in the x direction from the processed image IMGPROC[x][y], the edge extracting unit 1051 performs, for each pixel of the processed image IMGPROC[x][y], a product-sum operation of pixel values of nine pixels in total including the pixel and eight pixels around the pixel and weight of the x direction filter 61 in a position corresponding to the pixel. A result of the product-sum operation is a gradient in the x direction in the pixel. Calculation of a gradient in the y direction is the same. When a calculation result of a gradient in the x direction in a certain position (x, y) of the processed image IMGPROC[x][y] is represented as dx and a calculation result of a gradient in the y direction is represented as dy, a gradient intensity image DMAG[x][y] and a gradient direction image DIRC[x][y] are calculated by Equations (2) and (3) below.

$$DMAG[x][y]=|dx|+|dy| \qquad (2)$$

$$DIRC[x][y]=\arctan(dy/dx) \qquad (3)$$

DMAG[x][y] and DIRC[x][y] are two-dimensional arrays having the same size as the processed image IMGPROC[x][y]. A coordinate x, y of the DRAM[x][y] and DIRC[x][y] corresponds to a coordinate of IMGPROC[x][y].

The edge extracting unit 1051 calculates, concerning all pixels in the small regions SXR[r], SYR[r], EXR[r], and EYR[r] in the processed image IMGPROC[x][y], the gradient intensity image DMAG[x][y] and the gradient direction image DIRC[x][y]. Subsequently, the edge extracting unit

1051 compares the edge threshold THR[r] and DMAG[x][y] according to the small regions SXR[r], SYR[r], EXR[r], and EYR[r] to which the calculated DMAG[x][y] belongs. If DMAG[x][y]>THR[r], the edge extracting unit 1051 stores 1 in the edge image EDGE[x][y]. Otherwise, the edge extracting unit 1051 stores 0 in the edge image EDGE[x][y]. The edge image EDGE[x][y] is a two-dimensional array having the same size as the image IMGSRC[x][y]. The coordinate x, y of EDGE[x][y] corresponds to the coordinate of IMGSRC [x][y].

As explained above, the small region dividing unit 1031 divides the processed image IMGPROC[x][y] including the object into the small regions (SXR[r], SYR[r], EXR[r], and EYR[r]) according to an illumination state on the outside of the vehicle. The edge threshold setting unit 1041 sets the edge threshold THR[r] for each of the small regions and extracts an edge using the edge threshold THR[r] for each of the small regions. Consequently, even in a scene in which a part of a pedestrian appears bright, it is possible to correctly extract edges of a contour of the pedestrian in a bright region and a dark region.

Next, content of the processing by the obstacle recognizing unit 1061 is explained with reference to detection of a pedestrian as an example.

First, the obstacle recognizing unit 1061 sets the matching determination regions (SXG[g], SYG[g], EXG[g], EYG[g]) for performing pedestrian determination in the edge image EDGE[x][y]. As explained concerning the processed image generating unit 1021, in this embodiment, an image is enlarged or reduced using the camera geometry such that all objects having height of 180 [cm] and width of 60 [cm] have a size of 16 dots×12 dots in the processed image IMGPROC [x][y]. Therefore, when the size of a matching determination region is set as 16 dots×12 dots and the edge image EDGE [x][y] is larger than 16 dots×12 dots, the obstacle recognizing unit 1061 sets plural matching determination regions to be laid at a fixed interval in the edge image EDGE[x][y]. Concerning each of the matching determination regions (SXG[g], SYG[g], EXG[g], EYG[g]), the obstacle recognizing unit 1061 performs determination using a discriminator 81 explained in detail below and, if there is a place where an output of the discriminator 81 is 1, determines that a pedestrian is present in the position.

Next, a method of determining whether an obstacle is a pedestrian using the discriminator 81 is explained.

Examples of a method of detecting a pedestrian through image processing include a method by template matching for preparing plural representative templates of pedestrian patterns and performing a differential cumulative operation or a normalization correlation operation to calculate a degree of coincidence and a method of performing pattern recognition using a discriminator such as a neural network. Irrespective of which of the methods is adopted, a database of sources serving as indexes for determining whether an obstacle is a pedestrian in advance is necessary. Patterns of various pedestrians are stored as a database and a representative template is created and a discriminator is generated from the database. In an actual environment, pedestrians in various clothes, postures, and body shapes are present and conditions such as illumination and weather are different. Therefore, it is necessary to prepare a large number of databases and reduce misdeterminations. In detecting a pedestrian, the former method by the template matching is not realistic because the number of templates is enormous if determination omission is prevented.

Therefore, in this embodiment, the latter method of determining a pattern using the discriminator is adopted. The size of the discriminator does not depend on the size of a database of sources. A database for generating the discriminator is referred to as teacher data.

Figure 7:
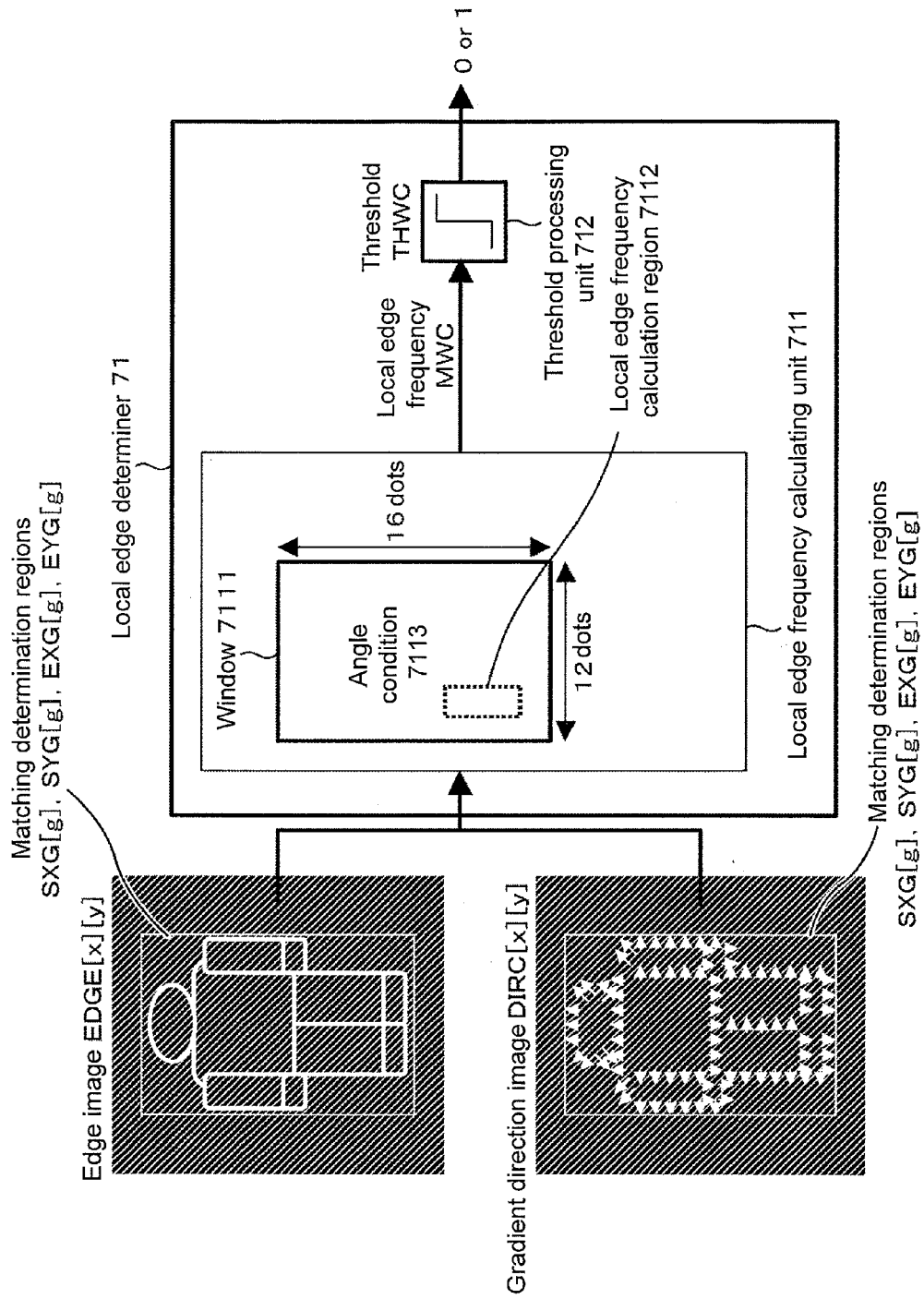
FIG. 7 is a diagram showing an example of a local edge determiner in the obstacle recognizing unit of the present invention.

The discriminator 81 used in this embodiment determines whether an obstacle is a pedestrian on the basis of plural local edge determiners. First, the local edge determiner is explained using an example shown in FIG. 7. A local edge determiner 71 is a determiner that receives input of the edge image EDGE[x][y], the gradient direction image DIRC[x] [y], and the matching determination regions (SXG[g], SYG [g], EXG[g], EYG[g]) and outputs a binary value 0 or 1. The local edge determiner 71 includes a local edge frequency calculating unit 711 and a threshold processing unit 712.

The local edge frequency calculating unit 711 has a local edge frequency calculation region 7112 in a window 7111 having the same size as the matching determination region (SXG[g], SYG[g], EXG[g], EYG[g]). The local edge frequency calculating unit 711 sets, from a positional relation between the matching determination region (SXG[g], SYG [g], EXG[g], EYG[g]) and the window 7111, positions where a local edge frequency is calculated in the edge image EDGE [x][y] and the gradient direction image DIRC[x][y] and calculates a local edge frequency MWC. The local edge frequency MWC is a total number of pixels in which an angle value of the gradient direction image DIRC[x][y] satisfies an angle condition 7113 and the edge image EDGE[x][y] in a position corresponding thereto is 1.

In the case of the example shown in FIG. 6, the angle condition 7113 is a condition that the angle value is between 67.5 degrees to 112.5 degrees or between 267.5 degrees and 292.5 degrees and is a condition for determining whether a value of the gradient direction image DIRC[x][y] is in a fixed range.

The threshold processing unit 712 has a threshold THWC set in advance. If the local edge frequency MWC calculated by the local edge frequency calculating unit 711 is equal to or higher than the threshold THWC, the threshold processing unit 712 outputs 1. Otherwise, the threshold processing unit 712 outputs 0. If the local edge frequency MWC calculated by the local edge frequency calculating unit 711 is equal to or lower than the threshold THWC, the threshold processing unit 712 may output 1. Otherwise, the threshold processing unit 712 may output 0.

Figure 8:
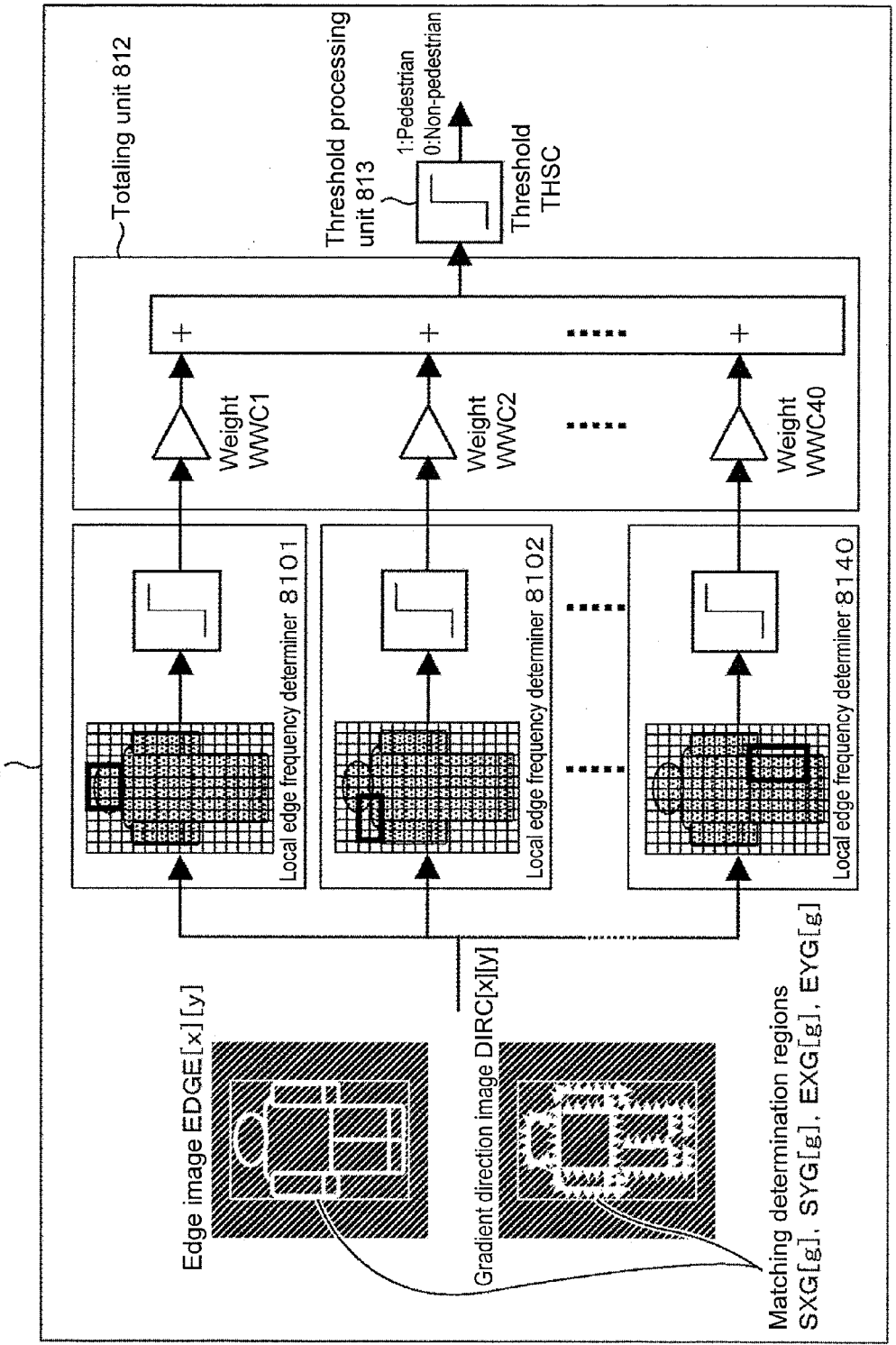
FIG. 8 is a diagram showing an example of pedestrian determination using a discriminator in the obstacle recognizing unit of the present invention.

Next, the discriminator is explained using FIG. 8. The discriminator 81 receives input of the edge image EDGE[x] [y], the gradient direction image DIRC[x][y], and the matching determination regions (SXG[g], SYG[g], EXG[g], EYG [g]). If a pedestrian is present in the regions, the discriminator 81 outputs 1. If a pedestrian is absent in the regions, the discriminator 81 outputs 0. The discriminator 81 includes forty local edge frequency determiners 8101 to 8140, a totaling unit 812, and a threshold processing unit 813.

Each kind of processing by the local edge frequency determiners 8101 to 8140 is the same as the processing by the local edge determiner 71. However, the local edge frequency calculation region 7112, the angle condition 7113, and the threshold THWC are respectively different from those of the local edge determiner 71.

The totaling unit 812 multiplies outputs from the local edge frequency determiners 8101 to 8140 with weights WWC1 to WWC40 corresponding thereto and outputs a total of the outputs multiplied with the weights WWC1 to WWC40.

The threshold processing unit 813 has a threshold THSC. If an output of the totaling unit 812 is larger than the threshold THSC, the threshold processing unit 813 outputs 1. Otherwise, the threshold processing unit 813 outputs 0.

The local edge frequency calculation region 7112, the angle condition 7113, the threshold THWC, the weights WWC1 to WWC40, and the final threshold THSC, which are parameters of the local edge frequency determiners of the discriminator 81, are adjusted using the teacher data such that 1 is output when an input image to the discriminator is a pedestrian and 0 is output when the input image is not a pedestrian. Means for machine learning such as AdaBoost may be used for the adjustment or the adjustment may be performed manually.

For example, a procedure for determining parameters using AdaBoost from NPD pieces of teacher data of pedestrians and NBG pieces of teacher data of non-pedestrians is as explained below. In the following explanation, the local edge frequency determiner is represented as cWC[m]. Here, m is an ID number of the local edge frequency determiner.

First, plural (e.g., one million) local edge frequency determiners cWC[m] having different local edge frequency calculation regions 7112 and angle conditions 7113 are prepared. Each of the local edge frequency determiners cWC[m] calculates values of the local edge frequency MWC from all teacher data and determines the threshold THWC for each of the values. As the threshold THWC, a value that can best classify teacher data of pedestrians and teacher data of non-pedestrians is selected.

Next, the discriminator 81 gives weight of wPD[nPD]=½NPD to each of the teacher data of the pedestrians. Similarly, the discriminator 81 gives weight of wBG [nBG]=½NBG to each of the teacher data of the non-pedestrians. Here, nPD is an ID number of the teacher data of the pedestrians and nBG is an ID number of the teacher data of the non-pedestrians.

With k set to 1, thereafter, the discriminator 81 repeatedly performs processing.

First, the discriminator 81 normalizes weight such that a total of the weights of the teacher data of all the pedestrians and non-pedestrians is 1. Subsequently, the discriminator 81 calculates error detection ratios cER[m] of the local edge frequency determiners. The error detection ratio cER[m] is, in the local edge frequency determiner cWC[m], a total of weights of the teacher data of the pedestrians, outputs of which are 0 when the teacher data of the pedestrians is input to the local edge frequency determiner cWC[m], or the teacher data of the non-pedestrians, outputs of which are 1 when the teacher data of the non-pedestrians is input to the local edge frequency determiner cWC[m], i.e., teacher data, outputs of which are wrong.

After calculating the error detection ratios cER[m] of all the local edge frequency determiners, the discriminator 81 selects ID mMin of the local edge frequency determiner having a minimum error detection ratio and sets a final local edge frequency determiner WC[k] equal to cWC[mMin].

Subsequently, the discriminator 81 updates the weights of the teacher data. For the update, the discriminator 81 multiplies the weights of the teacher data of the pedestrians, results of which obtained by applying the final local edge frequency determiner WC[k] are 1, among the teacher data of the pedestrians and the teacher data of the non-pedestrians, results of which obtained by applying the final local edge frequency determiner WC[k] are 0, among the teacher data of the non-pedestrians, i.e., the weights of the teacher data having correct outputs with a coefficient BT[k]=cER[mMin]/(1−cER[mMin]).

With k set to k+1, the discriminator 81 repeats the processing until k reaches a value set in advance (e.g., 40). The final local edge frequency determiner WC obtained after the end of the repeated processing is the discriminator 81 automatically adjusted by AdaBoost. The weights WWC1 to WWC40 are calculated from 1/BT[k] and the threshold THSC is set to 0.5.

As explained above, the obstacle recognizing unit 1061 can detect a pedestrian using edges of a contour of the pedestrian extracted by the edge extracting unit 1051.

The discriminator 81 used for detection of a pedestrian is not limited to the method explained in this embodiment. Template matching using normalized correlation, a neural network discriminator, a support vector machine discriminator, a Bayes discriminator, and the like may be used.

The dividing means of the small region dividing unit 1031 are not limited to the three dividing means in this embodiment and may be two or less or four or more dividing means.

Next, a second embodiment of a vehicle-mounted object detection device 2000, which is the obstacle detection device according to the present invention, is explained below using the drawings.

Figure 9:
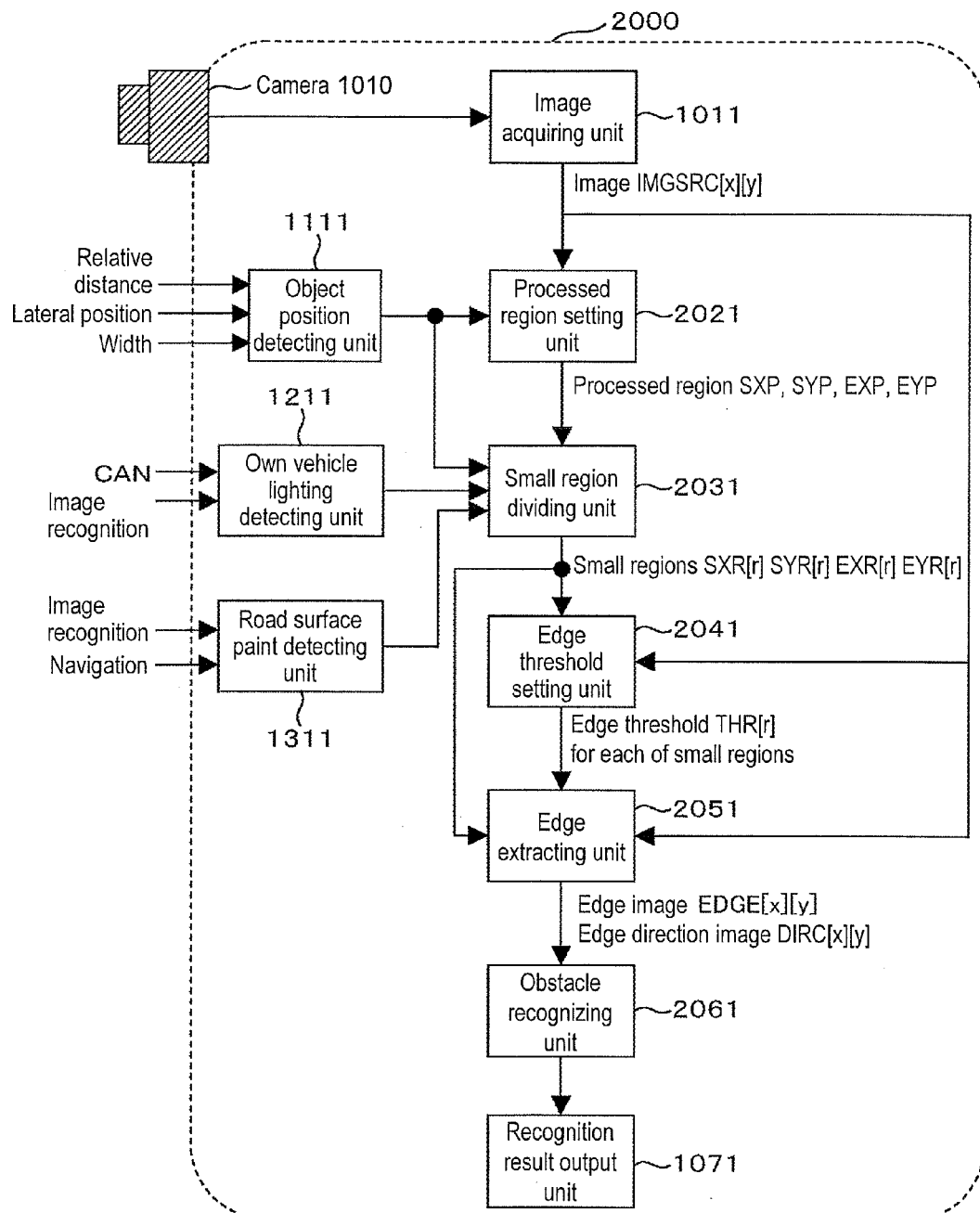
FIG. 9 is a diagram showing a second embodiment of the obstacle detection device according to the present invention.

FIG. 9 is a block diagram representing the embodiment of the vehicle-mounted object detection device 2000. In the following explanation, only components different from those of the vehicle-mounted object detection device 1000 explained above are explained in detail. The same components are denoted by the same reference numerals and signs and explanation of the components is omitted.

The vehicle-mounted object detection device 2000 is incorporated in a camera mounted on an automobile, an integrated controller, or the like and used for detecting an obstacle from the inside of an image picked up by the camera. In this embodiment, the vehicle-mounted object detection device 2000 is configured to detect a pedestrian from the inside of an image obtained by picking up an image around an own vehicle.

The vehicle-mounted object detection device 2000 includes a computer including a CPU, a memory, and an I/O. The vehicle-mounted object detection device 2000 is programmed with predetermined processing and repeatedly executes processing at a period set in advance. The vehicle-mounted object detection device 2000 includes, as shown in FIG. 9, the image acquiring unit 1011, a processed region setting unit 2021, a small region dividing unit 2031, an edge threshold setting unit 2041, an edge extracting unit 2051, an obstacle recognizing unit 2061, and the recognition result output unit 1071 and further includes, depending on an embodiment, the object position detecting unit 1111, the own vehicle lighting detecting unit 1211, and the road surface paint detecting unit 1311.

The processed region setting unit 2021 sets a processed region (SXP, SYP, EXP, EYP) where a pedestrian, who is an obstacle, is detected from the inside of the image IMGSRC [x][y]. Details of the setting are explained later.

The small region dividing unit 2031 divides the processed region (SXP, SYP, EXP, EYP) of the image IMGSRC[x][y] into plural small regions (SXR[r], SYR[r], EXR[r], EYR[r]). Here, r is an ID number of the small region. Although details of the division are explained later, the processed image is divided into plural small regions on the basis of an illumination state on the outside of the own vehicle.

The edge threshold setting unit 2041 determines the edge threshold THR[r] from pixel values of the image IMGSRC [x][y] in the small regions (SXR[r], SYR[r], EXR[r], EYR [r]). Details of setting of the threshold are explained later.

The edge extracting unit 2051 calculates gray gradient values in the small regions of the image IMGSRC[x][y] and generates, using the edge threshold THR[r] of a small region corresponding thereto, the binary edge image EDGE[x][y] and the gradient direction image DIRC[x][y] having information concerning the direction of an edge. Details of the processing are explained later.

The obstacle recognizing unit 2061 sets, in the edge image EDGE[x][y], the matching determination regions (SXG[g], SYG[g], EXG[g], EYG[g]) for performing pedestrian determination and determines presence or absence of a pedestrian using the edge image EDGE[x][y] in the matching determination regions and the gradient direction image DIRC[x][y] in a region of a position corresponding thereto. Here, g represents an ID number given when plural regions are set. Details of the recognition processing are explained later.

Next, content of the processing in the processed region setting unit 2021 is explained using FIG. 3.

The processed region setting unit 2021 selects a region where pedestrian detection processing is performed in the image IMGSRC[x][y] and calculates a range of coordinates of the region, the start point SXP and the end point EXP on the x coordinate (the lateral direction) and the start point SYP and the end point EYP on the y coordinate (the longitudinal direction).

The processed region setting unit 2021 may use or may not use the object position detecting unit 1111. First, processing performed when the object position detecting unit 1111 is used in the processed region setting unit 2021 is explained.

The processed region setting unit 2021 calculates, from the relative distance PY[b], the lateral position PX[b], and the lateral width WD[b] of an object detected by the object position detecting unit 1111, a position on an image of the detected object (the start point SXB and the end point EXB on the x coordinate (the lateral direction) and the start point SYB and the end point EYB on the y coordinate (the longitudinal direction)). If camera geometric parameters that associate coordinates on a camera image and a positional relation in the real world are calculated in advance by a method such as camera calibration and the height of an object is assumed as, for example, 180 [cm] in advance, a position on the image is uniquely determined.

In some case, a difference between a position on an image of an object detected by the object position detecting unit 1111 and a position on an image of the same object appearing in a camera image occurs because of reasons such as an error of attachment of the camera 1010 and a delay in communication with a radar. Therefore, the object position (SXP, EXP, SYP, EYP) obtained by correcting the object position (SXB, EXB, SYB, EYB) on the image is calculated. The correction expands a region by a predetermined amount or moves the region. For example, SXB, EXB, SYB, and EYB are expanded up and down and to the left and right by a predetermined number of pixels. An object position obtained as a result of this correction is set as the processed region (SXP, EXP, SYP, EYP).

When the processing is performed for plural regions, the processed region (SXP, EXP, SYP, EYP) is set for each of the regions. The processing by the small region dividing unit to the processing by the obstacle recognizing unit are individually carried out on respective processed images.

Next, processing for setting the processed region (SXP, EXP, SYP, EYP) without using the object position detecting unit 1111 in the processed region setting unit 2021 is explained.

As a method of selecting a region when the object position detecting unit 1111 is not used, for example, there are a method of setting a region to search through an entire image while changing the size of a region and a method of setting a region while limiting the region to a specific position and a specific size. When the region is limited to the specific position, there is a method of limiting, using, for example, own vehicle speed, the region to a position to where the own vehicle advances after T seconds.

FIG. 3(b) is an example of searching for, using own vehicle speed, a position to where the own vehicle advances after 2.3 seconds. As the position and the size of a processed region, the processed region setting unit 2021 calculates the range (SYP2, EYP2) in the y direction on the image IMGSRC[x][y] using the camera geometric parameters from road surface height (0 cm) at a relative distance to the position to where the own vehicle advances after 2.3 seconds and assumed height of a pedestrian (in this embodiment, 180 cm). The range (SXP2, EXP2) in the x direction may not be limited or may be limited according to, for example, a predicted route of the own vehicle. A region (SXP2, SYP2, EXP2, EYP2) obtained as a result of this processing is set as the processed region (SXP, EXP, SYP, EYP).

Next, content of the processing in the small region dividing unit 2031 is explained using FIGS. 4 and 5.

In this embodiment, as a system for division into small regions, three kinds of dividing methods are explained: a system using the object position detecting unit 1111 and the own vehicle lighting detecting unit 1211, a system using the road surface paint detecting unit 1311, and a system not using all of the object position detecting unit 1111, the own vehicle lighting detecting unit 1211, and the road surface paint detecting unit 1311. Next, a method of selecting the three systems according to an illumination state on the outside of the vehicle is explained.

First, a first division system not using all of the object position detecting unit 1111, the own vehicle lighting detecting unit 1211, and the road surface paint detecting unit 1311 is explained. In this case, the small region dividing unit 2031 divides the processed region (SXP, EXP, SYP, EYP) in the image IMGSRC[x][y] into upper and lower regions with the y coordinate VPY at a vanishing point of an image as a boundary: the small region 1 (SXR[0], SYR[0], EXR[0], EYR[0]=VPY) and the small region 2 (SXR[1], SYR[1]=VPY, EXR[1], EYR[1]). The small region 1 and the small region 2 may be set without a gap as shown in FIG. 4(a). As shown in FIG. 4(b), for example, hysteresis of about five pixels may be provided with the division height VPY on the image as a boundary to prevent an edge due to a difference in an illumination state from occurring. In the case of the example shown in FIG. 4(b), all edges in the portion of the hysteresis are set to zero.

Next, a second division system using the object position detecting unit 1111 and the own vehicle lighting detecting unit 1211 is explained. As shown in FIG. 4(c), when an image including an object detected by the object position detecting unit 1111 is set by the processed region setting unit 2021 and it is determined by the own vehicle lighting detecting unit 1211 that the own vehicle is emitting light, the small region dividing unit 2031 calculates the light illumination height LZ for an object according to Equation (1) above from the relative distance PY[b] of the object detected by the object position detecting unit 1111, the illumination angle LANGL of the light of the own vehicle, and light height LHEIGHT of the own vehicle. The illumination angle LANGL of the light of the own vehicle and the light height LHEIGHT of the own vehicle are values set in advance according to a type of a vehicle.

The small region dividing unit 2031 converts LZ into a coordinate LZY on the image using the camera geometry and divides the processed region (SXP, EXP, SYP, EYP) in the image IMGSRC[x][y] into the small region 1 (SXR[0], SYR[0], EXR[0], EYR[0]=LZY) and the small region 2 (SXR[1], SYR[1]=LZY, EXR[1], EYR[1]) with LZY as a boundary.

The small region 1 and the small region 2 may be set without a gap as shown in FIG. 4(a). As shown in FIG. 4(b), for example, hysteresis of about five pixels may be provided with division height LZY on the image as a boundary to prevent an edge due to light from occurring. In the case of the example shown in FIG. 4(b), all edges in the portion of the hysteresis are set to zero.

Further, a third division system using the road surface paint detecting unit 1311 is explained. In this case, the small region dividing unit 2031 divides the processed region (SXP, EXP, SYP, EYP) in the image IMGSRC[xx][y] into upper and lower images with the position of detected road surface paint as a boundary. When a distance to the road surface paint is represented as PZ, the small region dividing unit 2031 converts, using a camera geometry model, the distance PZ into the y coordinate position PZY of the road surface paint on the image and divides, with PZY as a boundary, the image IMG-SRC[x][y] into the small region 1 (SXR[0], SYR[0], EXR[0], EYR[0]=PZY) and the small region 2 (SXR[1], SYR[1]=PZY, EXR[1], EYR[1]). The small region 1 and the small region 2 may be set without a gap as shown in FIG. 4(a). As shown in FIG. 4(b), for example, hysteresis of about five pixels may be provided with the division height PZY on the image as a boundary to prevent an edge due to a difference in an illumination state from occurring. In the case of the example shown in FIG. 4(b), all edges in the portion of the hysteresis are set to zero.

Next, a method of selecting the three division systems according to an illumination state on the outside of the vehicle is explained using FIG. 5. FIG. 5 is a flowchart describing switching conditions for the three division systems.

First, in step 51, the small region dividing unit 2031 determines, using an output of the own vehicle lighting detecting unit 1211, whether the own vehicle has its lamps on. When it is determined that the own vehicle has its lamps on, the small region dividing unit 2031 selects the second dividing means. When the own vehicle does not have its lamps on, the small region dividing unit 2031 shifts to the next step.

Subsequently, in step 52, the small region dividing unit 2031 determines, using an output of the road surface paint detecting unit 1311, whether road surface paint is present in front of the own vehicle. When it is determined that road surface paint is present in front of the own vehicle, the small region dividing unit 2031 selects the third dividing means. When it is determined that road surface paint is absent, the small region dividing unit 2031 selects the first dividing means.

As explained above, when it is determined by the own vehicle lighting detecting unit 1211 that the headlamp of the own vehicle is emitting light, the small region dividing unit 2031 determines that a part of a pedestrian is lit up by the headlamp of the own vehicle and selects the second dividing means. The second dividing means can divide a processed image into a region which the headlamps are illuminating and a dark region. When road surface paint is detected in front of the own vehicle by the road surface paint detecting unit 1311, the small region dividing unit 2031 determines that the lower half body of a pedestrian standing on the road surface paint appears bright and selects the third dividing means. The third dividing means can divide the processed image into a bright region including the road surface paint and a region without the road surface paint. Further, when the headlamp of the own vehicle is not on and road surface paint is not detected, the small region dividing unit 2031 selects the first dividing means. Even when the road surface is reflected by backlight and appears bright, the first dividing means can divide the processed image into a region bright with backlight and a region where the road surface does not appear.

As the three dividing means, the road surface paint detecting unit 1311 only has to include at least the first dividing means and does not need to include all the three dividing means. When the road surface paint detecting unit 1311 does not include any one of the dividing means, the conditional branch shown in FIG. 5 follows the route of NO.

Next, content of the processing by the edge threshold setting unit 2041 is explained.

The edge threshold setting unit 2041 determines the edge threshold THR[r] according to the average AVE[r] and the variance VAR[r] of gray values in the small regions SXR[r], SYR[r], EXR[r], and EYR[r] of the image IMGSRC[x][y] acquired by the image acquiring unit 1011. Here, r is an ID number of the small region.

The edge threshold is determined by, for example, a method of using a table having the average AVE[r] of gray values as an argument or a method of using a two-dimensional map having the average AVE[r] and the variance VAR[r] of gray values as arguments.

In the method of using the map having the average AVE[r] and the variance VAR[r] as arguments, a threshold of an optimum edge in images having various kinds of brightness is manually determined in advance and averages and variances at that point converted into a map are used. Consequently, it is possible to determine an optimum threshold from the average AVE[r] and the variance VAR[r] of gray values in the small regions.

For determination of the edge threshold THR[r], an average and a variance of pixel values of an image obtained as a result of applying, for example, a Sobel filter for the image IMGSRC[x][y] may be used rather than gray values. An arithmetic operation of the Soble filter is explained later.

Next, content of the processing by the edge extracting unit 2051 is explained.

The edge extracting unit 2051 applies a differential filter such as a Sobel filter to the image IMGSRC[x][y] acquired by the image acquiring unit 1011 to calculate the intensity and the direction of the gradient of an image and subjects the intensity of the gradient to threshold processing to thereby extract an edge. In the following explanation, the Sobel filter is applied as the differential filter.

The Sobel filter has a size of 3×3 as shown in FIG. 6. Two kinds of filters are present: the x direction filter 61 that calculates a gradient in the x direction and the y direction filter 62 that calculates a gradient in the y direction. In calculating a gradient in the x direction from the image IMGSRC[x][y], the edge extracting unit 2051 performs, for each pixel of the image IMGSRC[x][y], a product-sum operation of pixel values of nine pixels in total including the pixel and eight pixels around the pixel and weight of the x direction filter 61 in a position corresponding to the pixel. A result of the product-sum operation is a gradient in the x direction in the pixel. Calculation of a gradient in the y direction is the same. When a calculation result of a gradient in the x direction in a certain position (x, y) of the image IMGSRC[x][y] is represented as dx and a calculation result of a gradient in the y direction is represented as dy, the gradient intensity image DMAG[x][y] and the gradient direction image DIRC[x][y] are calculated by Equations (2) and (3) above.

DMAG[x][y] and DIRC[x][y] are two-dimensional arrays having the same size as the image IMGSRC[x][y]. A coordinate x, y of the DMAG[x][y] and DIRC[x][y] corresponds to a coordinate of the image IMGSRC[x][y].

The edge extracting unit 2051 calculates, concerning all pixels in the small regions SXR[r], SYR[r], EXR[r], and EYR[r] in the image IMGSRC[x][y], the gradient intensity image DMAG[x][y] and the gradient direction image DIRC[x][y]. Subsequently, the edge extracting unit 2051 compares the edge threshold THR[r] and DMAG[x][y] according to the small regions SXR[r], SYR[r], EXR[r], and EYR[r] to which the calculated DMAG[x][y] belongs. If DMAG[x][y]>THR[r], the edge extracting unit 2051 stores 1 in the edge image EDGE[x][y]. Otherwise, the edge extracting unit 2051 stores 0 in the edge image EDGE[x][y]. The edge image EDGE[x][y] is a two-dimensional array having the same size as the image IMGSRC[x][y]. The coordinate x, y of EDGE[x][y] corresponds to the coordinate of the image IMGSRC[x][y].

As explained above, the small region dividing unit 2031 divides the processed region (SXP, SYP, EXP, EYP) in the image IMGSRC[x][y] including an object into the small regions (SXR[r], SYR[r], EXR[r], and EYR[r]) according to an illumination state on the outside of the vehicle. The edge threshold setting unit 2041 sets the edge threshold THR[r] for each of the small regions and the edge extracting unit 2051 extracts an edge using the edge threshold THR[r] for each of the small regions. Consequently, even in a scene in which a part of a pedestrian appears bright, it is possible to correctly extract edges of a contour of the pedestrian in a bright region and a dark region.

Next, content of the processing by the obstacle recognizing unit 2061 is explained with reference to detection of a pedestrian as an example.

First, the obstacle recognizing unit 2061 sets the matching determination regions (SXG[g], SYG[g], EXG[g], EYG[g]) for performing pedestrian determination in the edge image EDGE[x][y].

The obstacle recognizing unit 2061 determines width WG=EXG[g]−SXG[g] and height HG=EYG[g]−SYG[g] of the matching determination regions (SXG[g], SYG[g], EXG[g], EYG[g]) from the size on an image of an object having height of 180 [cm] and width of 60 [cm] in the image IMGSRC[x][y]. A method of determining the width WG and the height HG can be uniquely determined according to the camera geometry using a distance to the object and vanishing point when the vehicle-mounted object detection device 2000 includes the object position detecting unit 1111 or when the distance to the object is provisionally determined.

When a distance is unknown, for example, when a pedestrian is detected while changing the size of a matching determination region in a processed region, the obstacle recognizing unit 2061 fixes an aspect ratio of the matching determination region and sets the size of the matching determination region while changing the size. When the processed region (SXP, SYP, EXP, EYP) is larger than the matching determination regions (SXG[g], SYG[g], EXG[g], EYG[g]), the obstacle recognizing unit 2061 sets plural matching determination regions to be laid at a fixed interval in the edge image EDGE[x][y].

The obstacle recognizing unit 2061 performs determination using a discriminator 82 concerning the respective matching determination regions (SXG[g], SYG[g], EXG[g], EYG[g]). If there is a place where an output of the discriminator 82 is 1, the obstacle recognizing unit 2061 determines that a pedestrian is present in the position.

Next, a method of determining whether an obstacle is a pedestrian using the discriminator 82 is explained. The discriminator 82 used in this embodiment determines whether an obstacle is a pedestrian on the basis of plural local edge determiners.

The discriminator 82 in this embodiment has the same configuration as the discriminator 81. However, whereas, in the discriminator 81, the size of the window 7111 in the local edge frequency determiners 8101 to 8140 is the width of 12 dots and the height of 16 dots, the discriminator 82 enlarges or reduces the size of the window 7111 to be the same as the width WG and the height HG of the matching determination region. According to the enlargement or the reduction of the window 7111, the discriminator 82 enlarges or reduces the local edge frequency calculation region 7112 in the window 7111 at the same ratio. Processing after this is the same as that of the discriminator 81. Detailed explanation of the processing is omitted.

Figure 10:
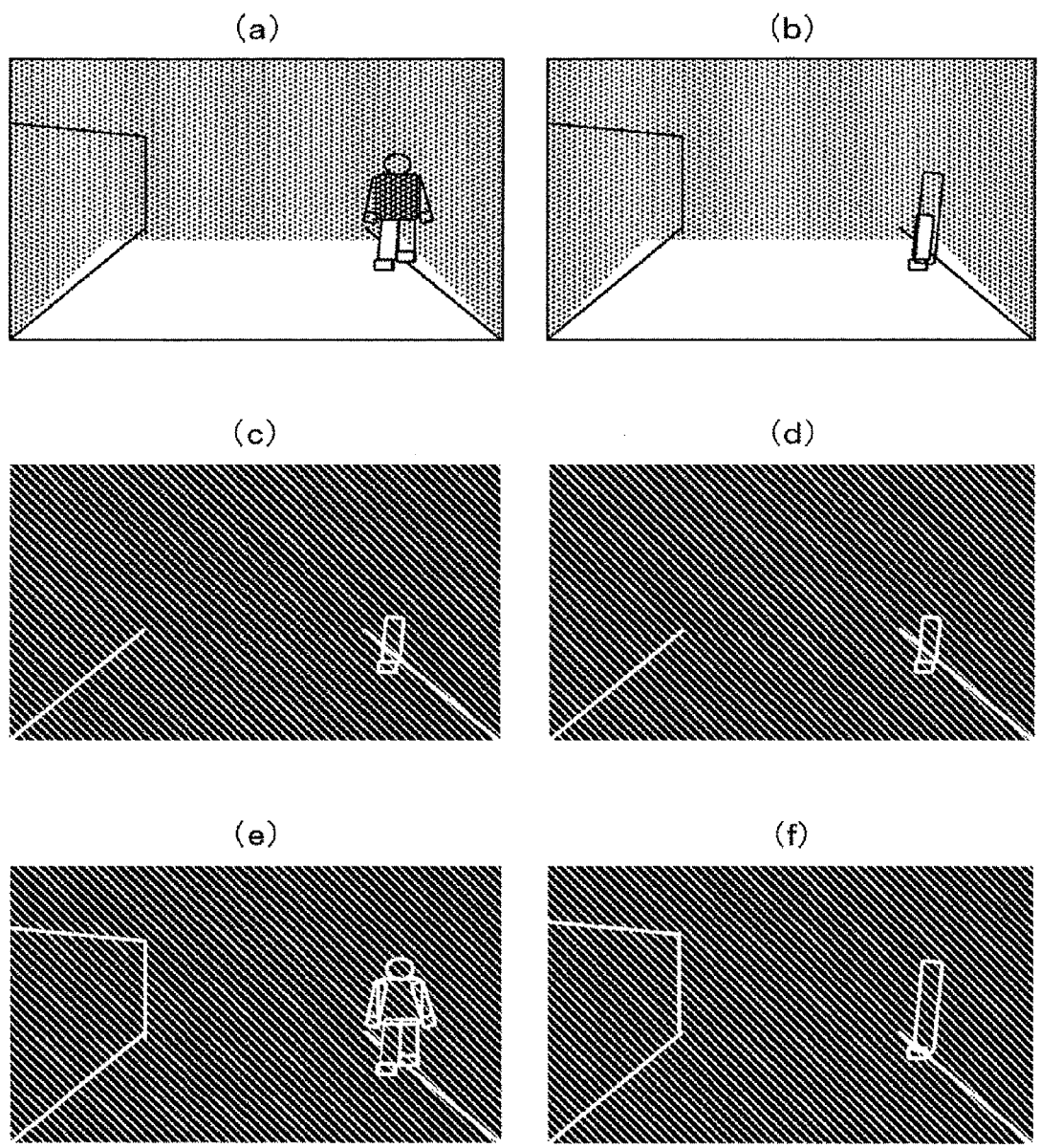
FIG. 10 is a schematic diagram for explaining an obstacle recognition result of the present invention.

As explained above, it is possible to accurately determine presence or absence of a pedestrian, for example, in a scene shown in FIG. 10 by using the vehicle-mounted object detection device 1000 (or the vehicle-mounted object detection device 2000).

FIGS. 10(a) and 10(b) are examples of objects, on parts of which light from the headlamp of the own vehicle is incident. (a) is a pedestrian and (b) is a signboard. In such a case, if edges are extracted without dividing images above and below the height of the headlamp illumination of the own vehicle, edges shown in FIGS. 10(c) and 10(d) are respectively obtained and cannot be distinguished. However, by using the present invention, edges are extracted as shown in FIGS. 10(e) and 10(f). Edges of a contour of the pedestrian are correctly extracted. The pedestrian shown in FIG. 10(a) can be recognized.

The obstacle recognizing unit 1061 (2061) in the vehicle-mounted object detection device 1000 (or the vehicle-mounted object detection device 2000) does not have to adopt the form including the discriminator 81 (82). As an example, another embodiment of an obstacle recognizing unit that determines an obstacle according to the length of a continuous vertical edge is explained using FIG. 11.

Figure 11:
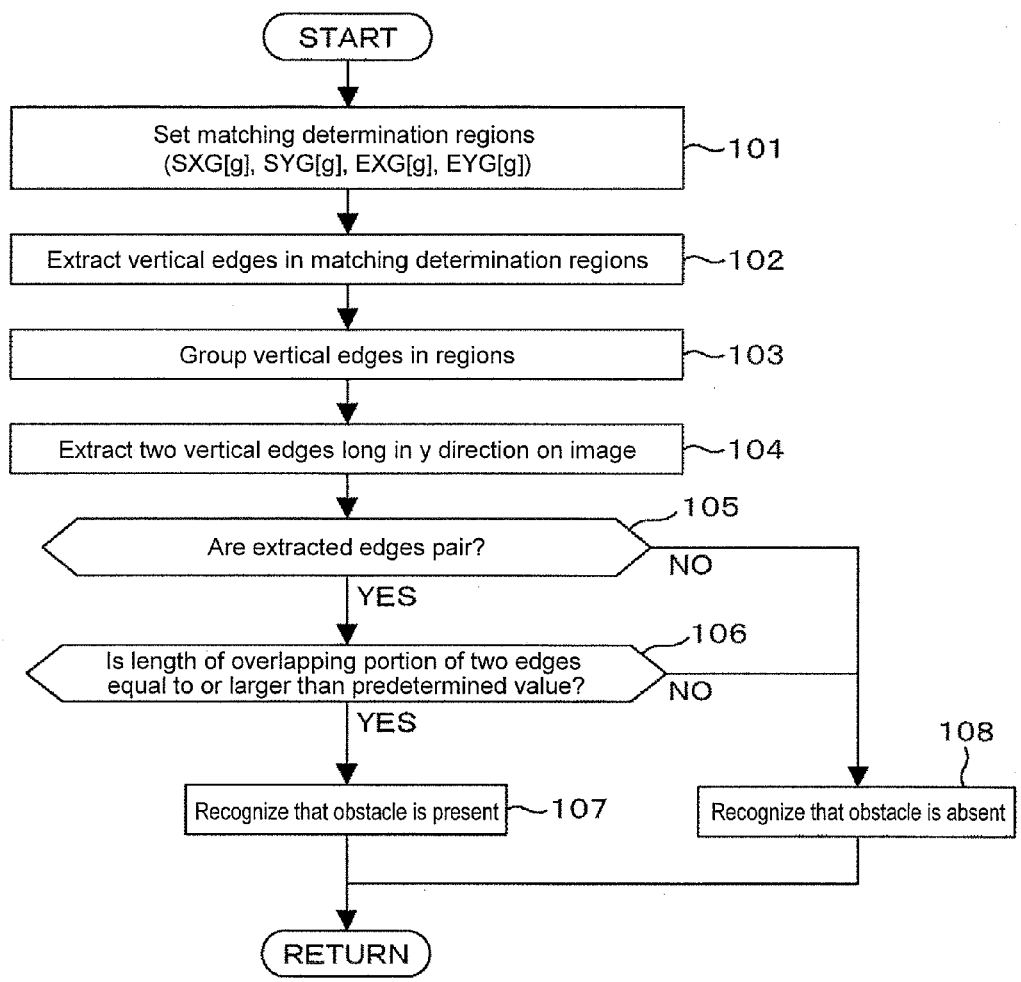
FIG. 11 is a diagram showing a flowchart of another embodiment of the obstacle recognizing unit of the present invention.

FIG. 11 is a flowchart representing a flow of processing in the other embodiment of the obstacle recognizing unit.

First, in step 101, like the obstacle recognizing units 1061 and 2061, the obstacle recognizing unit sets the matching determination regions (SXG[g], SYG[g], EXG[g], EYG[g]).

Subsequently, in step 102, the obstacle recognizing unit extracts an edge in the longitudinal direction in edge images EDGE[x][y] in the matching determination regions (SXG[g], SYG[g], EXG[g], EYG[g]).

First, the obstacle recognizing unit determines presence or absence of an edge using a value of the edge image EDGE[x][y]. The edge image EDGE[x][y] is a binary image. When a value of the coordinate (x, y) of the edge image EDGE[x][y] is 1, the edge image EDGE[x][y] indicates that an edge, i.e., a contour of an object is present in the coordinate (x, y) of the image IMGSRC[x][y] corresponding thereto.

The obstacle recognizing unit determines the direction of the edge using the gradient direction image DIRC[x][y]. The gradient direction image DIRC[x][y] has a value of 0 to 359 and represents an angle of a light and shade change. Therefore, when a value of the coordinate (x, y) of the edge image EDGE[x][y] is 1, it is possible to learn a direction on an image of a contour of an object by referring to a value of the gradient direction image DIRC[x][y] of the coordinate (x, y) corresponding thereto.

Therefore, step 102 can be realized by extracting, for example, a portion where the edge image EDGE[x][y] is 1 and a value of the gradient direction image DIRC[x][y] of the coordinate (x, y) corresponding thereto is in a range of 90±22.5[°] or 270±22.5[°].

The obstacle recognizing unit stores a result of the extraction in, for example, a vertical edge image VEDGE[x][y]. The vertical edge image VEDGE[x][y] is a two-dimensional array having the same size as the edge image EDGE[x][y]. The coordinate x, y of VEDGE[x][y] corresponds to the coordinate of EDGE[x][y]. In the vertical edge image VEDGE[x][y], "1" is substituted in a pixel in a coordinate that satisfies the above conditions and "0" is substituted in a coordinate that does not satisfy the conditions.

Further, in step 103, the obstacle recognizing unit performs grouping of portions where a pixel value is "1" in the vertical edge image VEDGE[x][y]. For the grouping, for example, labeling processing is used.

In the labeling processing, first, the obstacle recognizing unit searches for a place where a pixel value is 1 in the vertical edge image VEDGE[x][y] and gives a label number 1 to a pixel in the place. Subsequently, if a pixel value of a pixel adjacent to the pixel is 1, the obstacle recognizing unit gives the label number 1 to the pixel as well. The obstacle recognizing unit repeats this processing until all pixels adjacent to the pixels having the label number 1 have a pixel value 0.

Subsequently, if pixels to which label numbers are not given yet are present, the obstacle recognizing unit gives a label number 2 to one of the pixels and performs processing same as the processing in the case of the label number 1. The obstacle recognizing unit repeats the above processing until no pixel having the pixel value 1 to which a label number is not given remains.

As a result of the labeling processing, some label numbers are given to edges of the vertical edge image VEDGE[x] [y] and grouped.

Subsequently, in step 104, the obstacle recognizing unit extracts two vertical edges long in the y direction on the image out of the grouped edges.

Figure 12:
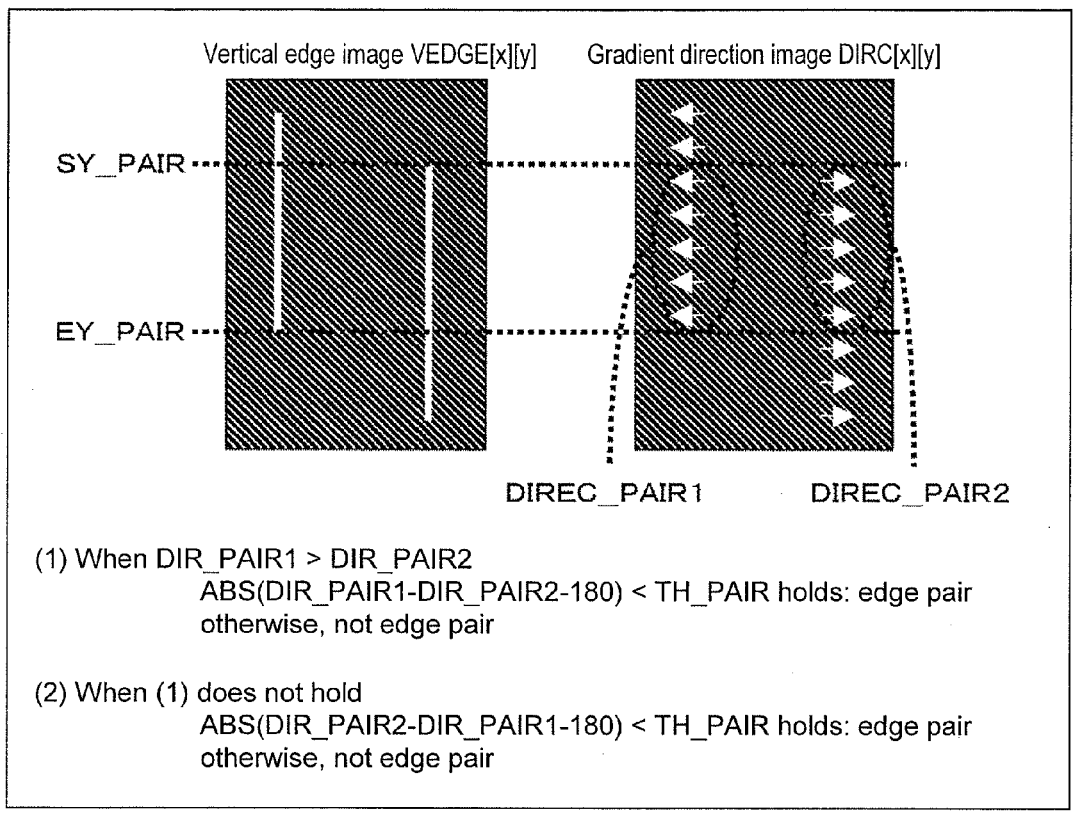
FIG. 12 is a diagram for explaining pair determination for edges in the obstacle recognizing unit of the present invention.

Further, in step 105, the obstacle recognizing unit determines whether the extracted edges are a pair. For the determination whether the edges are a pair, the vertical edge image VEDGE[x][y] and the gradient direction image DIRC[x][y] are used. FIG. 12 is an example of the pair determination for edges.

First, the obstacle recognizing unit calculates an overlapping range (SY_PAIR, EY_PAIR) in the y direction on the image of the two edges extracted in the vertical edge image.

Subsequently, the obstacle recognizing unit calculates, concerning each of the extracted two edges, averages DIR_PAIR1 and DIR_PAIR2 in a gradient direction from the gradient direction image DIRC[x][y] in a position corresponding thereto within the range of SY_PAIR, EY_PAIR.

The obstacle recognizing unit determines the directions of DIR_PAIR1 and DIR_PAIR2 are a pair. The determination is performed according to whether
(1) in the case of DIR_PAIR1>DIR_PAIR2,
ABS(DIR_PAIR1−DIR_PAIR2−180)<TH_PAIR holds, and
(2) otherwise
ABS(DIR_PAIR2−DIR_PAIR1−180)<TH_PAIR holds.
TH_PAIR is a tolerance of an angle for determining whether edges are a pair. In this embodiment, TH_PAIR is set to 22.5. ABS( ) is an absolute value. As a result of the determination, when it is determined that the directions are a pair, the obstacle recognizing unit proceeds to step 106. Otherwise, the obstacle recognizing unit proceeds to step 108.

In step 106, the obstacle recognizing unit determines whether the length of the overlapping range (SY_PAIR, EY_PAIR) in the y direction on the image is equal to or larger than a predetermined value TH_LENGTHPAIR. When it is determined that the length is equal to or larger than the predetermined value, the obstacle recognizing unit proceeds to step 107. Otherwise, i.e., when it is determined that the length is smaller than the predetermined value, the obstacle recognizing unit proceeds to step 108.

In step 107, the obstacle recognizing unit recognizes that an obstacle is present in the matching determination regions (SXG[g], SYG[g], EXG[g], EYG[g]) and conveys information to the obstacle recognizing unit 1061 (2061).

In step 108, the obstacle recognizing unit recognizes that an obstacle is absent in the matching determination regions (SXG[g], SYG[g], EXG[g], EYG[g]) and does not convey information to the obstacle recognizing unit 1061 (2061).

Figure 13:
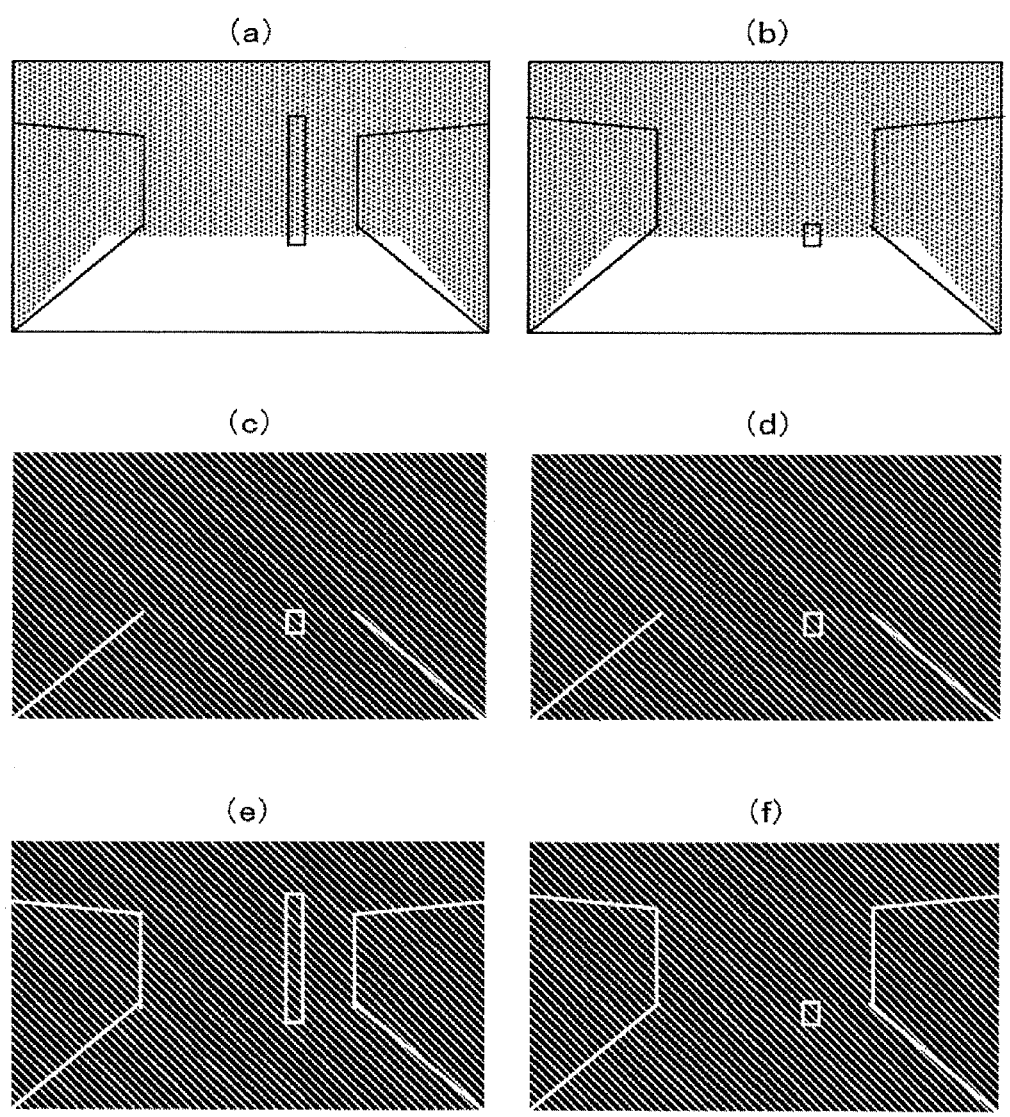
FIG. 13 is a schematic diagram for explaining an obstacle recognition result of the present invention.

As explained above, it is possible to correctly determine presence or absence of an obstacle in, for example, a scene shown in FIG. 13 by using this embodiment.

FIGS. 13(a) and 13(b) are examples of objects, on parts of which light from the headlamp of the own vehicle is incident. (a) is a high obstacle and (b) is a low obstacle. In such a case, if edges are extracted without dividing images above and below the height of the headlamp illumination of the own vehicle, edges shown in FIGS. 13(c) and 13(d) are respectively obtained and cannot be distinguished.

However, by using the present invention, extracted edges are as shown in FIGS. 13(e) and 13(f). Edges in a dark region are correctly extracted. It can be recognized that (a) is an obstacle with which there is a risk of collision because the obstacle is tall and (b) is an obstacle with which there is no risk of collision because the obstacle is short.

Next, with reference to the pre-crash safety system as an example, an operation method of the system for outputting an alarm or automatically controlling a brake according to obstacle information (the relative distance PYO[b], the lateral position PXO[b], and the lateral width WDO[b]) output by the recognition result output unit of the vehicle-mounted object detection device as in the embodiment explained above is explained using FIG. 14.

Figure 14:
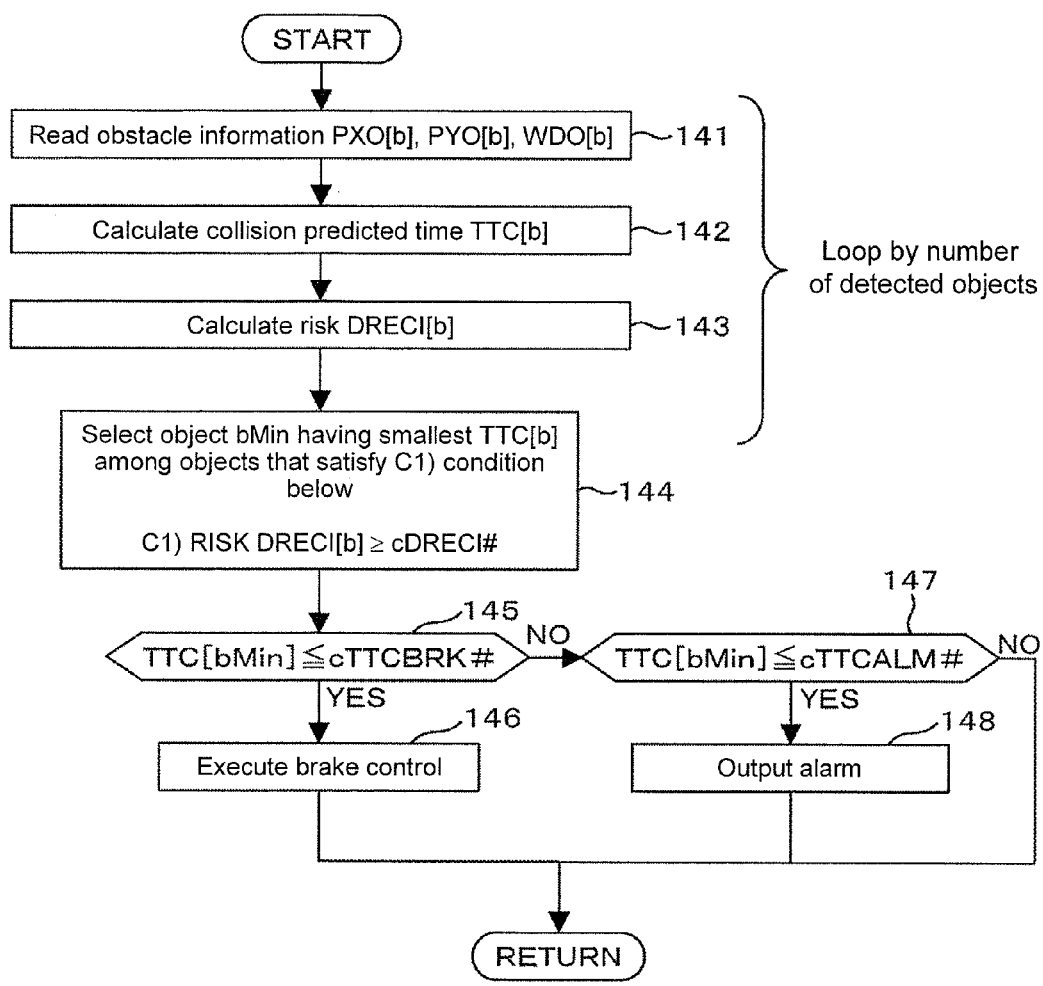
FIG. 14 is a diagram showing an operation flowchart of a pre-crash safety system to which the obstacle detection device of the present invention is applied.

FIG. 14 is a flowchart for explaining the operation method of the pre-crash safety system.

First, in step 141, the pre-crash safety system reads the obstacle information (the relative distance PYO[b], the lateral position PXO[b], and the lateral width WDO[b]) output by the recognition result output unit of any one of the obstacle detection devices explained above.

Subsequently, in step 142, the pre-crash safety system calculates collision predicted time TTC[i] of detected objects using Equation (4). Relative speed VYO[b] is calculated by subjecting the relative distance PYO[b] of the objects to pseudo-differential.

$$TTC[b]=PY[b] \div VY[b] \qquad (4)$$

Further, in step 143, the pre-crash safety system calculates a risk DRECI[b] for obstacles.

Figure 15:
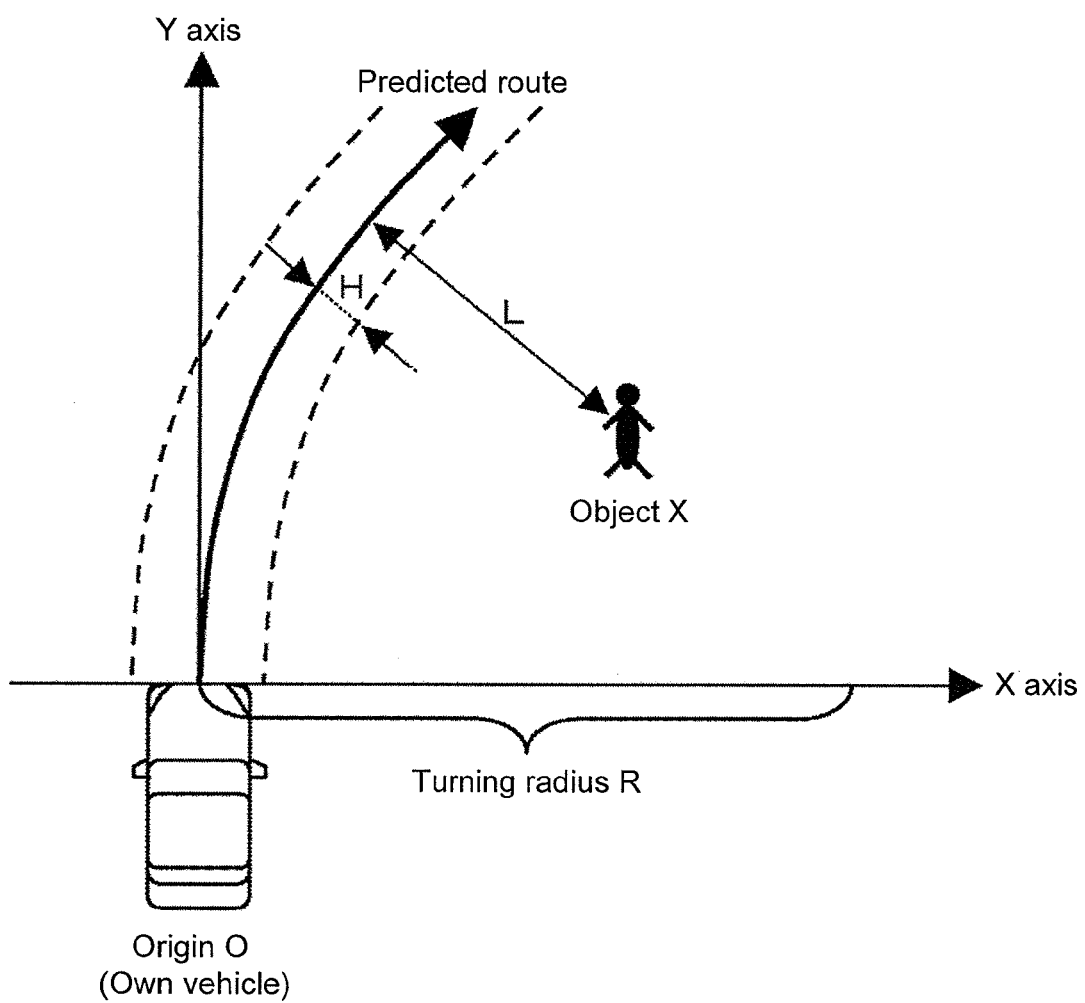
FIG. 15 is a diagram showing a risk calculating method of the pre-crash safety system of the present invention.

An example of a method of calculating the risk DRECI[b] for an object X[b] detected by the vehicle-mounted object detection device 1000 (or the vehicle-mounted object detection device 2000) is explained below using FIG. 15.

First, a method of estimating a predicted route is explained. As shown in FIG. 15, when an own vehicle position is set as the origin O, a predicted route can be approximated by an arc having a turning radius R that passes the origin O. The turning radius R is represented by Equation (5) using a steering angle α, speed Vsp, a stability factor A, a wheel base L, and a steering gear ratio Gs of the own vehicle.

$$R=(1+A \cdot Vsp \cdot Vsp) \times (L \cdot Gs/\alpha) \qquad (5)$$

Plus and minus of the stability factor dominate a steering characteristic of a vehicle. The stability factor is an important factor serving as an index indicating the magnitude of a change that depends on speed of a steady turning circle of the vehicle. As it is seen from Equation (5), the turning radius R changes, with the stability factor A set as a coefficient, in proportion to a square of the speed Vsp of the own vehicle. The turning radius R can be represented by Equation (6) using the vehicle speed Vsp and a yaw rate γ.

$$R = V/\gamma \quad (6)$$

Subsequently, the pre-crash safety system draws a perpendicular from the object X[b] to the center of the predicted route approximated by the arc having the turning radius R and calculates a distance L[b].

Further, the pre-crash safety system subtracts the distance L[b] from the vehicle width H. When a difference is a negative value, the pre-crash safety system sets the risk DRECI[b] to 0. When the difference is a positive value, the pre-crash safety system calculates the risk DRECI[b] according to Equation (7) below.

$$i \; DRECI[b] = (H - L[b])/H \quad (7)$$

The pre-crash safety system is configured to perform, as the processing in steps 141 to 143, loop processing according to the number of detected objects.

In step 144, the pre-crash safety system selects, according to the risk DRECI[b] calculated in step 143, objects that satisfy the condition of Equation (8) and selects an object bMin having minimum collision predicted time TTC[b] among the selected objects.

$$DRECI[b] \geq cDRECI\# \quad (8)$$

A predetermined value cDRECI# is a threshold for determining whether an object collides with the own vehicle.

Subsequently, in step 145, the pre-crash safety system determines, according to the collision predicted time TTC[bMin] of a selected object k, whether the own vehicle is in a range in which a brake is automatically controlled. When Equation (9) holds, the pre-crash safety system proceeds to step 146, executes the brake control, and ends the processing. When Equation (9) does not hold, the pre-crash safety system proceeds to step 147.

$$TTC[b\mathrm{Min}] \leq cTTCBRK\# \quad (9)$$

In step 147, the pre-crash safety system determines, according to the collision predicted time TTC[bMin] of the selected object bMin, whether the own vehicle is in a range in which an alarm is output. When Equation (10) holds, the pre-crash safety system proceeds to step 148, outputs an alarm, and ends the processing. When Equation (10) does not hold, the pre-crash safety system executes neither the brake control nor the alarm and ends the processing.

$$TTC[b\mathrm{Min}] \leq cTTCALM\# \quad (10)$$

As explained above, by using the vehicle-mounted object detection device 1000 or 2000 according to the present invention, in the scene shown in FIG. 10, even when light is incident only on the pedestrian's feet and it cannot be determined, only with the feet, whether the object is a pedestrian, edges in a region on which light is not incident can be extracted. Therefore, it is possible to recognize a pedestrian in front of the own vehicle and actuate the alarm and the brake control.

In the scene shown in FIG. 13, even when light is incident on only a part of the object and it cannot be determined, with the part, whether the object is an object having a risk of collision with the own vehicle, edges of a region on which light is not incident can be extracted. Therefore, it is possible to actuate the alarm and the brake control only for an object having a risk of collision with the own vehicle.

The application of the present invention to an example shown in FIG. 16 is explained.

First, a light and shade difference of a road surface caused by unevenness of the road surface in a state in which an external light that emits light of the same degree as the headlamp of the own vehicle is on is represented as DIF1_R. A light-colored object B having the same degree of light and shade difference when the external light is on is prepared. When a light and shade difference on the inside and the outside of a contour of the object B in the ON state of the external light is represented as DIF1_B and a light and shade difference on the inside and the outside of the contour of the object B in an OFF state of the external light is represented as DIF0_B, DIF1_B=DIF1_R. In the example shown in FIG. 16, DIF1_B=10 and DIF0_B=5.

An object A having completely the same shape as the object B but having a light and shade difference larger than that of the object B is prepared. A light and shade difference on the inside and the outside of a contour of the object A in the ON state of the external light is DIF1_A, a light and shade difference on the inside and the outside of the contour of the object A in the OFF state of the external light is DIF0_A, and DIF0_A=DIF1_B. In the example shown in FIG. 16, DIF1_A=20 and DIF0_A=10.

Since the light and shade difference of the contour of the object B is the same as the light and shade difference caused by the unevenness of the road surface, to prevent a misdetection due to the unevenness of the road surface from occurring, it is necessary to recognize the object A and not recognize the object B. However, since DIF0_A=DIF1_B, to recognize the object A when the external light is off, it is necessary to change the edge threshold according to an illumination state.

In the present invention, since the edge threshold is changed according to an illumination state, irrespective of whether the external light is on or off, the object A is recognized and the object B is not recognized. Further, in the present invention, since an image region including an object is divided into small regions and the edge threshold is set according to illumination states of the small regions, even when the headlamps are emitting light when the external light is off, the object A is recognized and the object B is not recognized.

The present invention is not limited to the embodiments explained above. Various modifications of the embodiments are possible without departing from the spirit of the present invention.

The invention claimed is:

1. An obstacle detection device comprising:
an image acquiring unit that captures an image obtained by picking up an image of an outside of an own vehicle;
a processed image generating unit that generates a processed image for detecting an obstacle from the captured image;
a small region dividing unit that divides the processed image into plural small regions;
an edge threshold setting unit that sets an edge threshold for each of the small regions from pixel values of the plural small regions and the processed image;
an edge extracting unit that calculates a gray gradient value of each of the small regions from the plural small regions and the processed image and generates, using the edge threshold for the small region corresponding to the calculated gray gradient value, a binary edge image and a gradient direction image having information concerning a direction of an edge;
an obstacle recognizing unit that sets a matching determination region for detecting an obstacle in the edge image and determines presence or absence of an obstacle from the edge image in the matching determination region and the gradient direction image corresponding to the edge image;

a recognition result output unit that outputs a result of the determination of presence or absence of an obstacle;

an object position detecting unit that detects a position of an obstacle on the outside of the own vehicle on the basis of a detection signal from an obstacle detecting unit; and an own vehicle lighting detecting unit that detects whether the lamps of the own vehicle are on, wherein the small region dividing unit divides the processed image into the plural small regions on the basis of an illumination state on the outside of the own vehicle, and the small region dividing unit calculates, when the own vehicle lighting detecting unit detects that the lamps are on, height of illumination on the obstacle on the basis of the position of the obstacle from the object position detecting unit, an illumination angle of the own vehicle lamp set in advance, and height of the own vehicle lamp from a road surface and divides the processed image into the plural small regions with a coordinate on the image with respect to the calculated height of illumination on the obstacle as a boundary.

2. The obstacle detection device according to claim 1, further comprising:

an object position detecting unit that detects a position of an obstacle on the outside of the own vehicle on the basis of a detection signal from an obstacle detecting unit;

an own vehicle lighting detecting unit that detects whether the lamps of the own vehicle are on; and a road surface paint detecting unit that detects paint on a traveling road surface of the own vehicle and calculates a distance from the own vehicle to the road surface paint, wherein the small region dividing unit divides, when the own vehicle lighting detecting unit detects that the own vehicle has its lamps on, the processed image into the plural small regions with a position obtained from a detection result of the object position detecting unit and a detection result of the own vehicle lighting detecting unit as a boundary, divides, when the own vehicle lighting detecting unit detects that the own vehicle does not have its lamps on and when the road surface paint detecting unit detects the road surface paint, the processed image into the plural small regions with a position of the detected road surface paint as a boundary, and divides, when the own vehicle lighting detecting unit detects that the own vehicle does not have its lamps on and when the road surface paint detecting unit does not detect the road surface paint, the processed image into the plural small regions with a vanishing point of the image as a boundary.

3. The obstacle detection device according to claim 1, wherein the obstacle recognizing unit generates plural vertical edge images from the edge image and the gradient direction image, groups vertical edge images satisfying a condition set in advance out of the plural vertical edge images, extracts two vertical edges out of the grouped vertical edge images, determines whether the two vertical edges are a pair on the basis of the vertical edge image and the gradient direction image, determines, when the two vertical edges are not a pair as a result of the determination, that an obstacle is absent in the edge image, determines, when the two vertical edges are a pair and when a length of the two vertical edges is equal to or larger than a length set in advance, that an obstacle is present in the edge image, and determines, when the two vertical edges are a pair and when the length of the two vertical edges is smaller than the length set in advance, that an obstacle is absent in the edge image.

4. The obstacle detection device according to claim 1, wherein the recognition result output unit actuates at least one of an alarm of the vehicle and brake control according to a position of the obstacle recognized by the obstacle recognizing unit.

5. The obstacle detection device according to claim 1, wherein the obstacle detection device has hysteresis in a boundary portion of the small regions divided by the small region dividing means.

6. An obstacle detection device comprising:

an image acquiring unit that captures an image obtained by picking up an image of an outside of an own vehicle;

a processed region setting unit that sets a processed region for detecting an obstacle from the captured image;

a small region dividing unit that divides the processed region into plural small regions;

an edge threshold setting unit that sets an edge threshold for each of the small regions from pixel values of the plural small regions and the image captured by the image acquiring unit;

an edge extracting unit that calculates a gray gradient value of each of the small regions from the plural small regions and the image captured by the image acquiring unit and generates, using the edge threshold for the small region corresponding to the calculated gray gradient value, a binary edge image and a gradient direction image having information concerning a direction of an edge;

an obstacle recognizing unit that sets a matching determination region for detecting an obstacle in the edge image and determines presence or absence of an obstacle from the edge image in the matching determination region and the gradient direction image corresponding to the edge image;

a recognition result output unit that outputs a result of the determination of presence or absence of an obstacle;

an object position detecting unit that detects a position of an obstacle on the outside of the own vehicle on the basis of a detection signal from an obstacle detecting unit; and an own vehicle lighting detecting unit that detects whether the lamps of the own vehicle are on, wherein the small region dividing unit divides the processed region into the plural small regions on the basis of an illumination state on the outside of the own vehicle, and the small region dividing unit calculates, when the own vehicle lighting detecting unit detects that the lamps are on, height of illumination on the obstacle on the basis of the position of the obstacle from the object position detecting unit, an illumination angle of the own vehicle lamp set in advance, and height of the own vehicle lamp from a road surface and divides the processed region into the plural small regions with a coordinate on the image with respect to the calculated height of illumination on the obstacle as a boundary.

7. The obstacle detection device according to claim 6, further comprising:

an object position detecting unit that detects a position of an obstacle on the outside of the own vehicle on the basis of a detection signal from an obstacle detecting unit;

an own vehicle lighting detecting unit that detects whether the lamps of the own vehicle are on; and a road surface paint detecting unit that detects paint on a traveling road surface of the own vehicle and calculates a distance from the own vehicle to the road surface paint, wherein the small region dividing unit divides, when the own vehicle lighting detecting unit detects that the own vehicle has its lamps on, the processed region into the plural small regions with a position obtained from a detection result of the object position detecting unit and a detection result of the own vehicle lighting detecting unit as a boundary, divides, when the own vehicle lighting detecting unit detects that the own vehicle does not have its lamps on and when the road surface paint detecting unit detects the road surface paint, the processed region into the plural small regions with a position of the detected road surface paint as a boundary, and divides, when the own vehicle lighting detecting unit detects that the own vehicle does not have its lamps on and when the road surface paint detecting unit does not detect the road surface paint, the processed region into the plural small regions with a vanishing point of the image as a boundary.

8. The obstacle detection device according to claim 6, wherein the obstacle recognizing unit generates plural vertical edge images from the edge image and the gradient direction image, groups vertical edge images satisfying a condition set in advance out of the plural vertical edge images, extracts two vertical edges out of the grouped vertical edge images, determines whether the two vertical edges are a pair on the basis of the vertical edge image and the gradient direction image, determines, when the two vertical edges are not a pair as a result of the determination, that an obstacle is absent in the edge image, determines, when the two vertical edges are a pair and when a length of the two vertical edges is equal to or larger than a length set in advance, that an obstacle is present in the edge image, and determines, when the two vertical edges are a pair and when the length of the two vertical edges is smaller than the length set in advance, that an obstacle is absent in the edge image.

9. The obstacle detection device according to claim 6, wherein the recognition result output unit actuates at least one of an alarm of the vehicle and brake control according to a position of the obstacle recognized by the obstacle recognizing unit.

10. The obstacle detection device according to claim 6, wherein the obstacle detection device has hysteresis in a boundary portion of the small regions divided by the small region dividing means.

* * * * *